(12) United States Patent
Fujishima et al.

(10) Patent No.: US 12,523,773 B2
(45) Date of Patent: Jan. 13, 2026

(54) MOVABLE DEVICE, DISTANCE-MEASURING DEVICE, DISPLAY DEVICE, AND WAVELENGTH-VARIABLE LASER

(71) Applicants: Masayuki Fujishima, Kanagawa (JP); Shuichi Suzuki, Kanagawa (JP)

(72) Inventors: Masayuki Fujishima, Kanagawa (JP); Shuichi Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 897 days.

(21) Appl. No.: 17/729,006

(22) Filed: Apr. 26, 2022

(65) Prior Publication Data

US 2022/0397677 A1   Dec. 15, 2022

(30) Foreign Application Priority Data

Jun. 9, 2021   (JP) .................................. 2021-096761

(51) Int. Cl.
*G02B 26/08*     (2006.01)
*G01S 7/481*     (2006.01)
(Continued)

(52) U.S. Cl.
CPC .......... *G01S 17/931* (2020.01); *G01S 7/4814* (2013.01); *G01S 7/4817* (2013.01); *G01S 7/484* (2013.01); *G02B 26/0858* (2013.01)

(58) Field of Classification Search
CPC .. G02B 26/001; G02B 26/007; G02B 26/008; G02B 26/0816–0866; G01J 3/06; G01S 7/4817
See application file for complete search history.

(56) References Cited

U.S. PATENT DOCUMENTS 5,631,514 A * 5/1997 Garcia .................... F16H 21/16
310/40 MM
5,739,945 A * 4/1998 Tayebati ............ G02B 26/0841
356/519
(Continued)

FOREIGN PATENT DOCUMENTS

EP      3570065 A2 * 11/2019 ............. G01S 17/42
JP      2003-029191      1/2003
(Continued)

OTHER PUBLICATIONS

U.S. Appl. No. 17/452,264, filed Oct. 26, 2021, Masayuki Fujishima, et al. (U.S. Publication No. US 2022/0155582 A1).

(Continued)

*Primary Examiner* — Nicholas R. Pasko
(74) *Attorney, Agent, or Firm* — XSENSUS LLP

(57) ABSTRACT

A movable device includes: a mechanism configured to drive a movable portion, the mechanism including: a gear including a first protrusion; and a cam in contact with the movable portion; and a driver to drive the mechanism, the driver including: a second protrusion to engage with the first protrusion; and an actuator to cause the second protrusion to reciprocate in response to application of voltage or electric current, to rotate the gear in a predetermined direction, to rotate the cam with the rotation of the gear to drive the movable portion. The first protrusion has a shape in which a downstream portion in the predetermined direction is lower in a direction perpendicular to the predetermined direction than an upstream portion. The second protrusion has a shape in which a downstream portion in the predetermined direction is higher in the direction perpendicular to the predetermined direction than an upstream portion.

20 Claims, 20 Drawing Sheets

(51) Int. Cl.
*G01S 7/484* (2006.01)
*G01S 17/931* (2020.01)

(56) References Cited

U.S. PATENT DOCUMENTS

| | | | | |
|---|---|---|---|---|
| 5,755,500 | A * | 5/1998 | Matsumoto | G03B 21/118 |
| | | | | 355/45 |
| 6,903,861 | B1 * | 6/2005 | Allen | G02B 6/357 |
| | | | | 359/872 |
| 8,054,520 | B2 * | 11/2011 | Noh | G02B 26/101 |
| | | | | 359/200.1 |
| 8,130,432 | B2 * | 3/2012 | Lee | G02B 26/101 |
| | | | | 359/221.3 |
| 9,964,753 | B2 * | 5/2018 | Imaizumi | G02B 26/0816 |
| 10,180,557 | B2 * | 1/2019 | Shihoh | G02B 27/646 |
| 10,191,273 | B2 * | 1/2019 | Kano | G01S 7/4817 |
| 10,444,073 | B1 | 10/2019 | Noguchi et al. | |
| 2016/0202471 | A1 * | 7/2016 | Oguro | B60K 35/22 |
| | | | | 359/221.2 |
| 2017/0315429 | A1 * | 11/2017 | Imaizumi | G03B 13/08 |
| 2019/0107717 | A1 * | 4/2019 | Heinrich | B60K 35/50 |
| 2021/0109342 | A1 | 4/2021 | Masayuki et al. | |
| 2021/0395073 | A1 | 12/2021 | Fujishima et al. | |
| 2021/0396994 | A1 | 12/2021 | Fujita et al. | |
| 2022/0137398 | A1 | 5/2022 | Seto et al. | |
| 2022/0155582 | A1 | 5/2022 | Fujishima et al. | |
| 2023/0305292 | A1 * | 9/2023 | Fujishima | G01S 17/931 |

FOREIGN PATENT DOCUMENTS

| | | |
|---|---|---|
| JP | 2013-057819 | 3/2013 |
| JP | 2020-101587 | 7/2020 |

OTHER PUBLICATIONS

U.S. Appl. No. 17/504,507, filed Oct. 19, 2021, Masami Seto, et al. (U.S. Publication No. US 2022/0137398 A1).

* cited by examiner

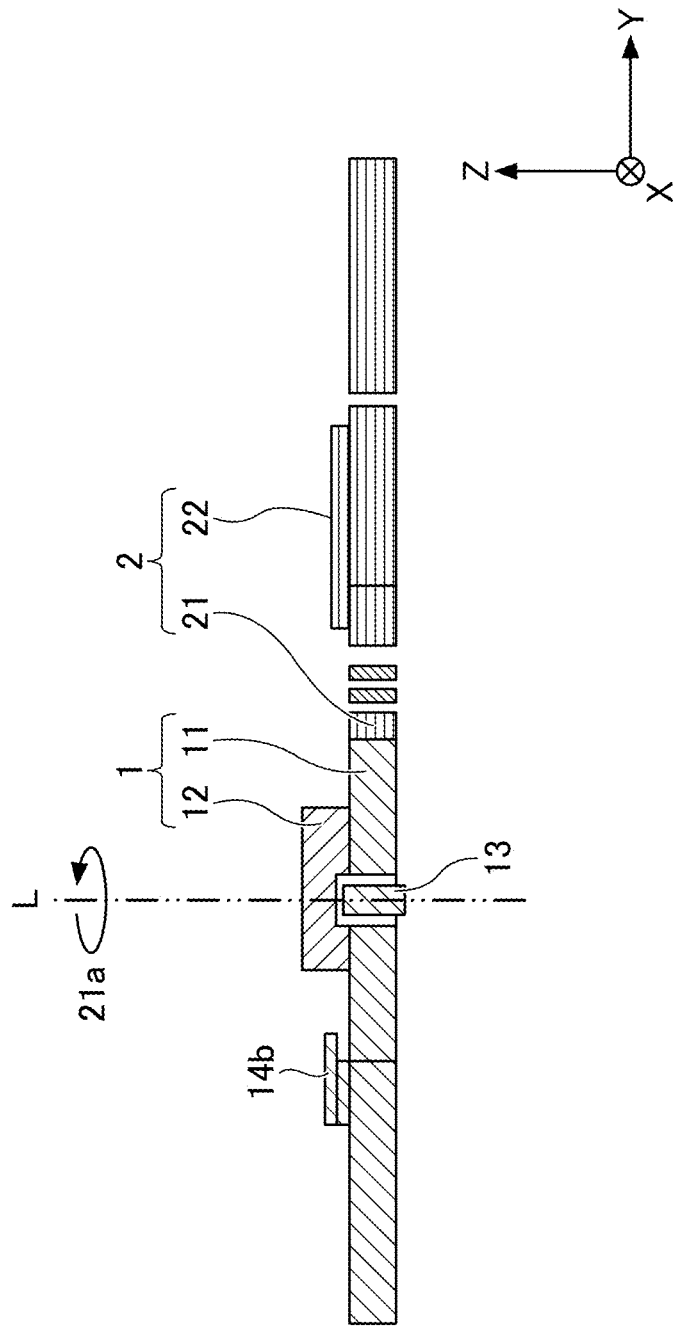

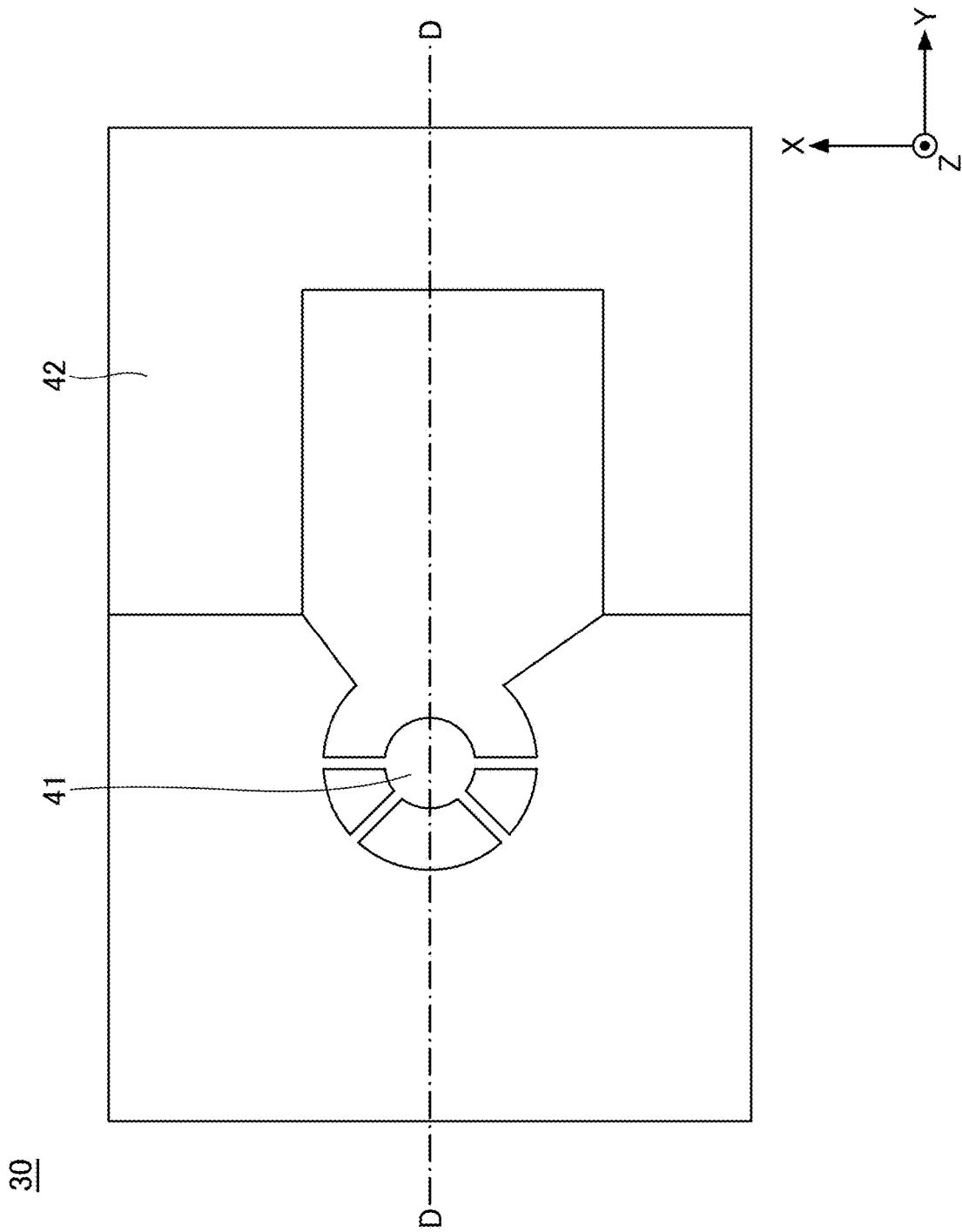

under specific notation to the contrary. Also, identical or similar reference numerals designate identical or similar components throughout the several views.

MOVABLE DEVICE, DISTANCE-MEASURING DEVICE, DISPLAY DEVICE, AND WAVELENGTH-VARIABLE LASER

CROSS-REFERENCE TO RELATED APPLICATIONS

This patent application is based on and claims priority pursuant to 35 U.S.C. § 119(a) to Japanese Patent Application No. 2021-096761, filed on Jun. 9, 2021, in the Japan Patent Office, the entire disclosure of which is hereby incorporated by reference herein.

BACKGROUND

Technical Field

The present disclosure relates to a movable device, a distance-measuring device, a display device, and a wavelength-variable laser.

Related Art

In recent years, with the development of micromachining technology applying semiconductor manufacturing technology, development of a movable device such as micro electro mechanical systems (MEMS) device manufactured by micromachining silicon or glass is advancing.

As such a movable device, the configuration is known that a mirror portion is connected to a pair of torsion bars serving as rotation shafts, and bending motion of an actuator coupled to a torsion bar support portion that supports ends of the torsion bars is converted into rotation motion of the mirror portion.

SUMMARY

An embodiment provides a movable device includes: a mechanism configured to drive a movable portion, the mechanism including: a gear including a first protrusion; and a cam in contact with the movable portion; and a driver to drive the mechanism, the driver including: a second protrusion configured to engage with the first protrusion; and an actuator to cause the second protrusion to reciprocate in response to application of voltage or electric current, to rotate the gear in a predetermined direction, to rotate the cam with the rotation of the gear to drive the movable portion. The first protrusion has a shape in which a downstream portion of the first protrusion in the predetermined direction is lower in a direction perpendicular to the predetermined direction than an upstream portion of the first protrusion. The second protrusion has a shape in which a downstream portion of the second protrusion in the predetermined direction is higher in the direction perpendicular to the predetermined direction than an upstream portion of the second protrusion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a cross-sectional view taken along line C-C in FIG. 5;

FIG. 7 is a plan view of the configuration of a third layer in the movable device in FIG. 1;

Figure 1:
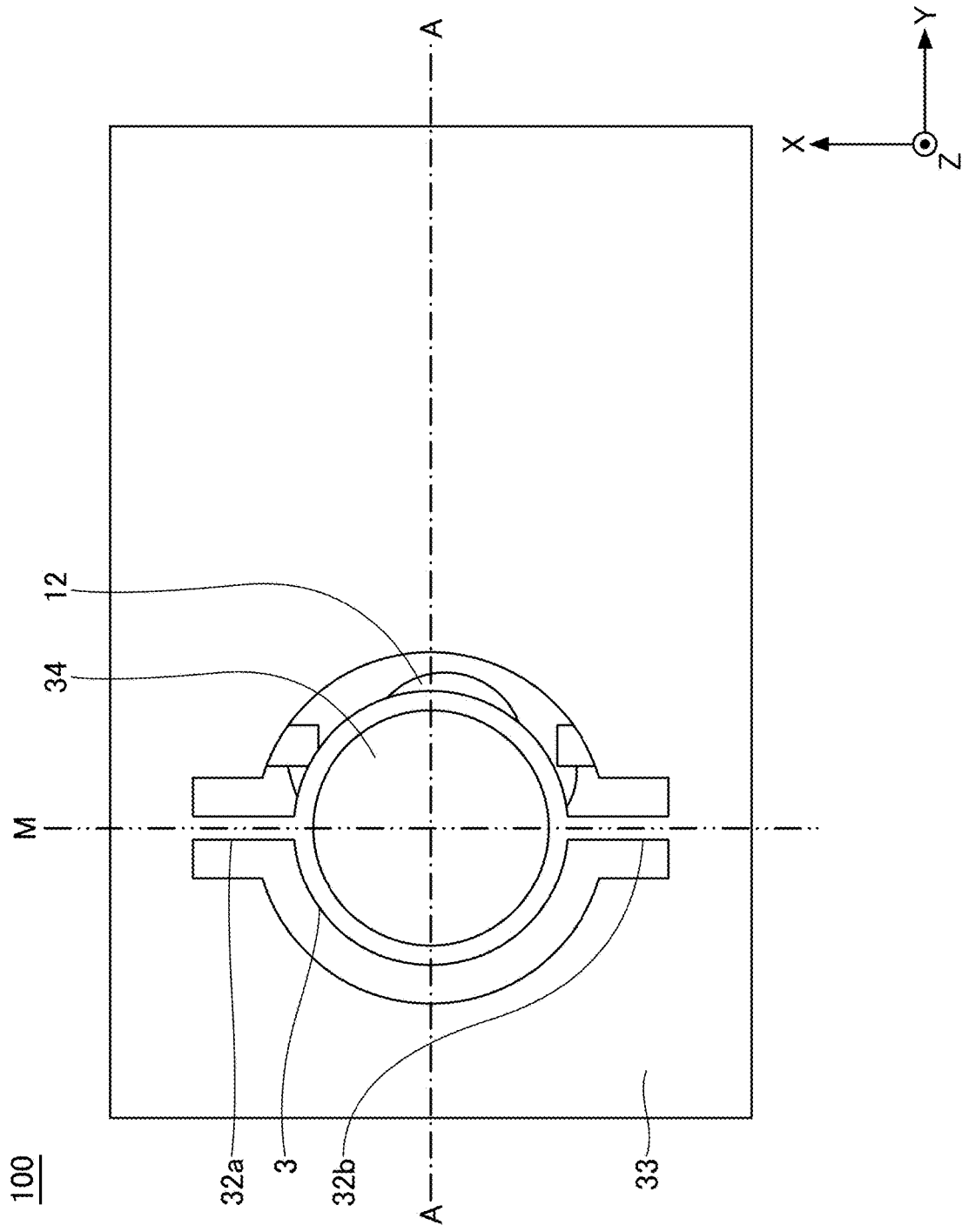
FIG. 1 is a plan view of the entire configuration of a movable device according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

Embodiments of the present disclosure provide a movable device that enables the movable portion to be stationary without application of voltage or electric current.

Embodiments of the present disclosure are described in detail with reference to the drawings. In the drawings, the same components are denoted by the same reference number, and redundant description thereof will be appropriately omitted.

In the following description, a Z-direction refers to a direction in which layers are stacked in, for example, an actuator, and an X-direction and a Y-direction are orthogonal to each other within a plane perpendicular to the Z-direction. Further, a plan view refers to viewing an object in the Z-direction. However, these directions do not limit the orientation of the movable device in use, and the movable device is oriented in any desired direction.

First Embodiment

Figure 2:
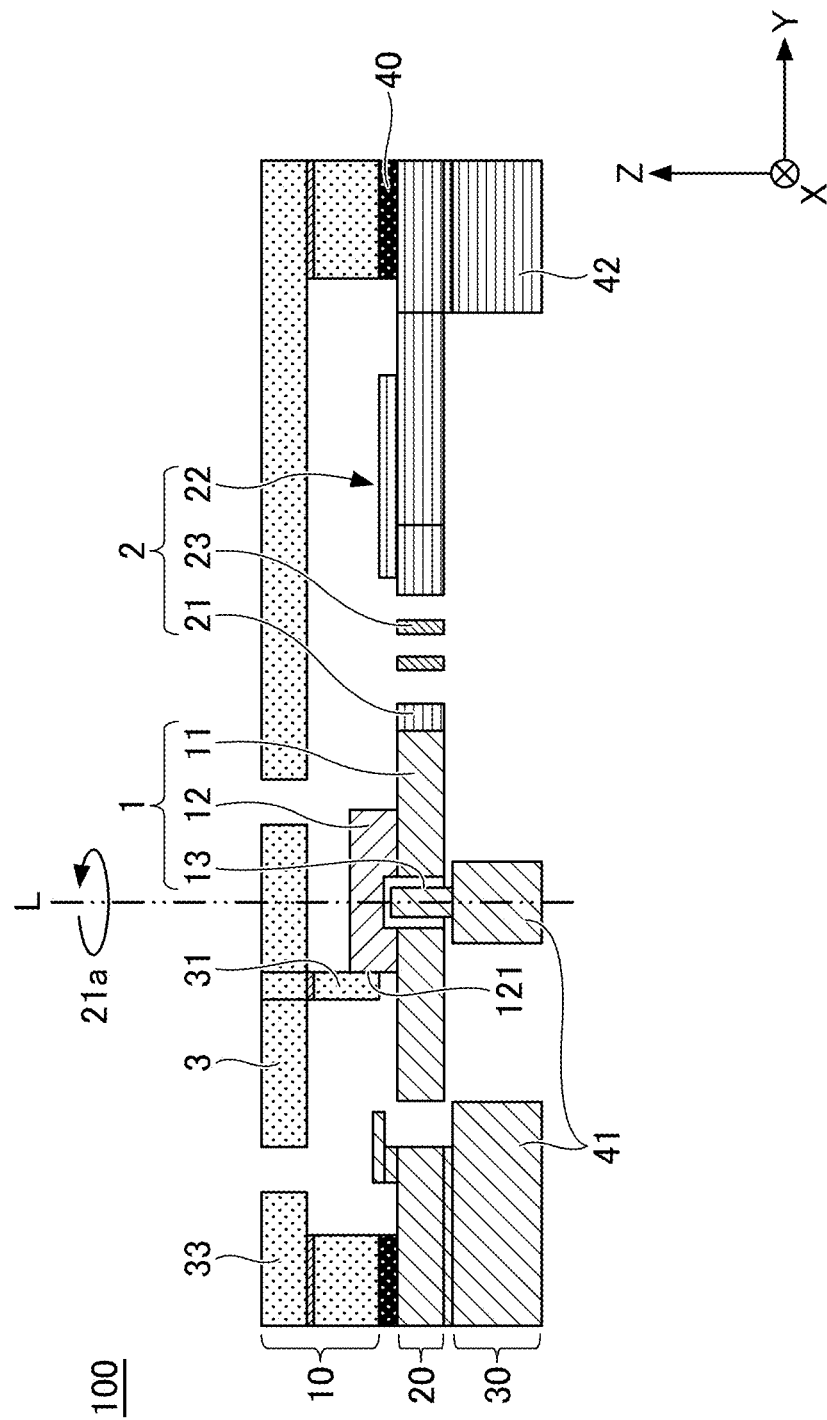
FIG. 2 is a cross-sectional view taken along line A-A in FIG. 1.

The configuration of a movable device 100 according to the first embodiment will be described with reference to FIGS. 1 to 8. FIG. 1 is a plan view of the entire configuration of the movable device 100. FIG. 2 is a cross-sectional view taken along line A-A in FIG. 1. The movable device 100 is, for example, a micro-electromechanical system (MEMS) device manufactured by a semiconductor process.

As illustrated in FIGS. 1 and 2, the movable device 100 includes: a first layer 10 including a movable portion 3; a second layer 20 including a mechanism 1 and a driver 2; and a third layer 30. For example, the first layer 10 is molded by etching a single silicon on insulator (SOI) substrate, and the second layer 20 and the third layer 30 are molded by etching a single SOI substrate. The movable device 100 is manufactured by bonding two molded substrates together via a bonding member 40 such as an adhesive.

Figure 3:
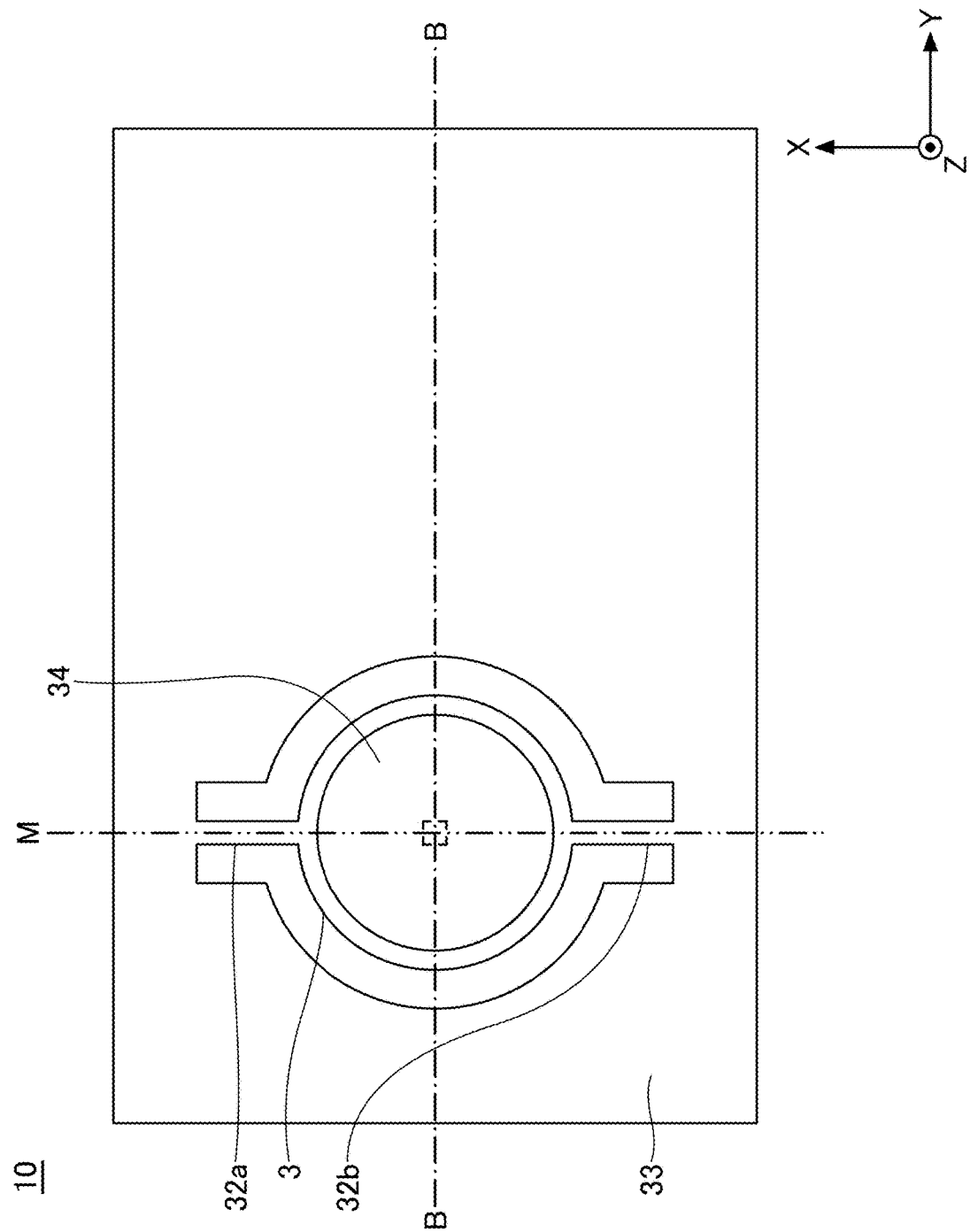
FIG. 3 is a plan view of the configuration of a first layer in the movable device in FIG. 1.
Figure 4:
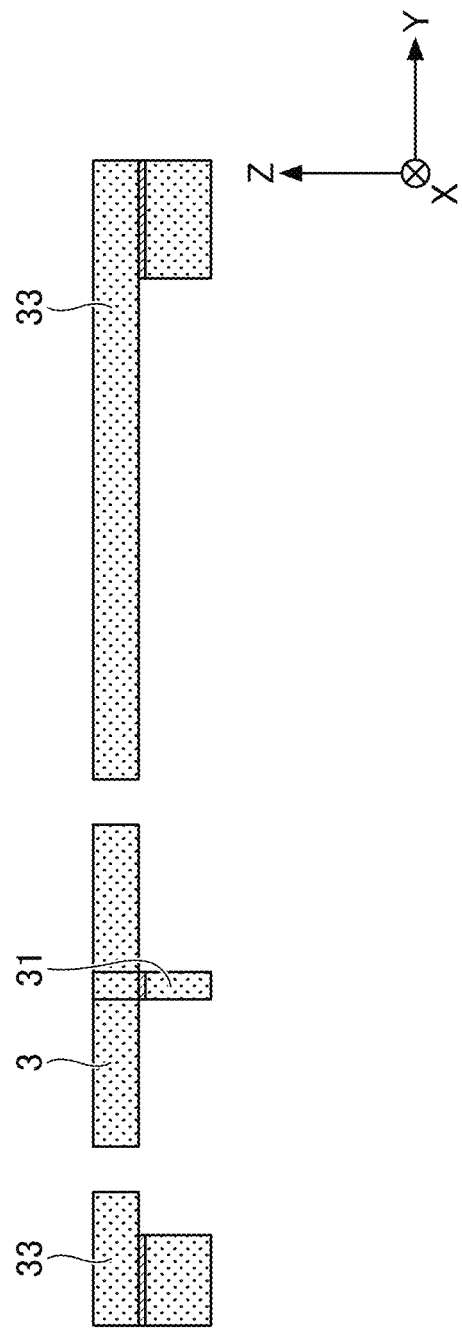
FIG. 4 is a cross-sectional view taken along line B-B in FIG. 3.
Figure 5:
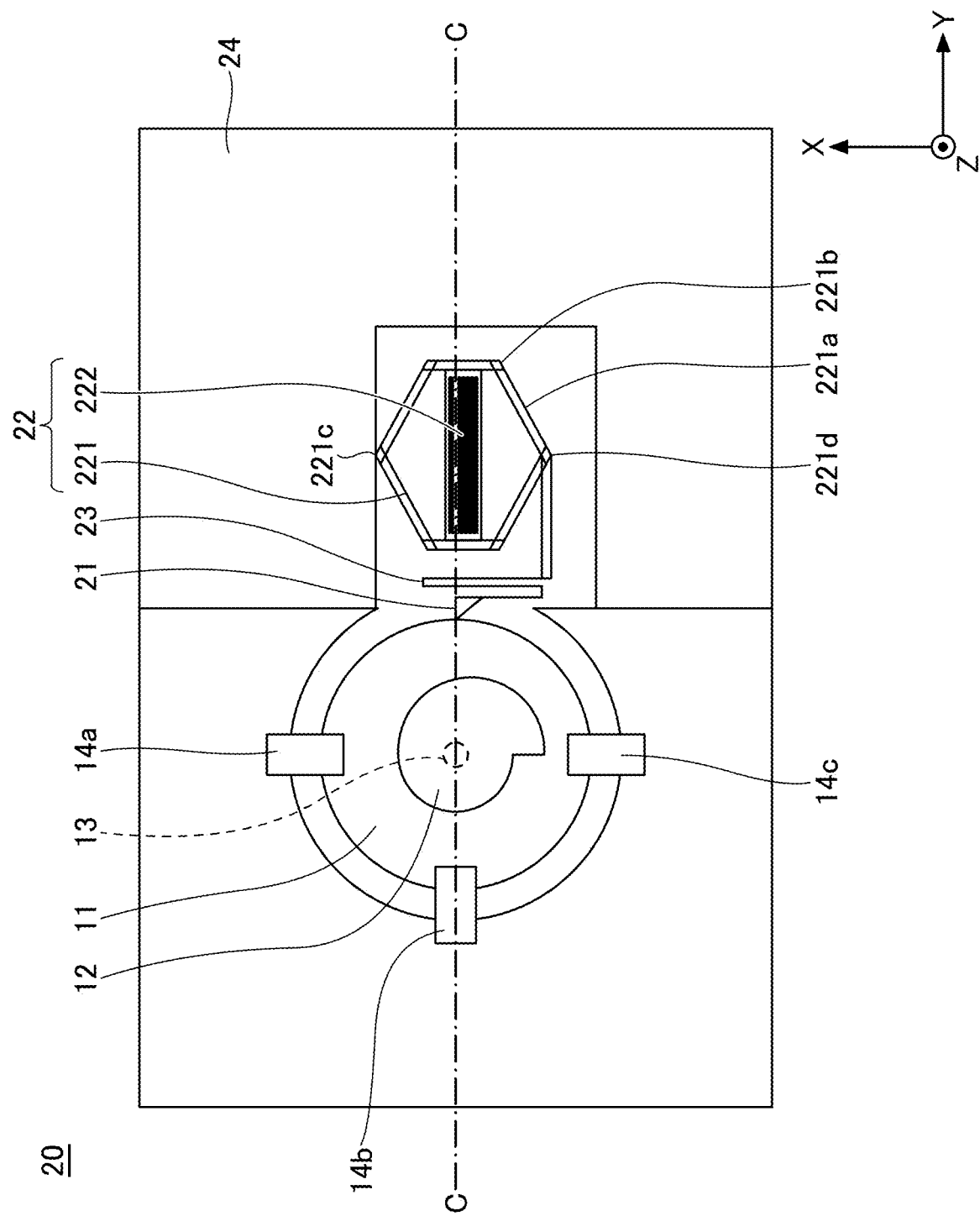
FIG. 5 is a plan view of the configuration of a second layer in the movable device in FIG. 1.
Figure 8A:
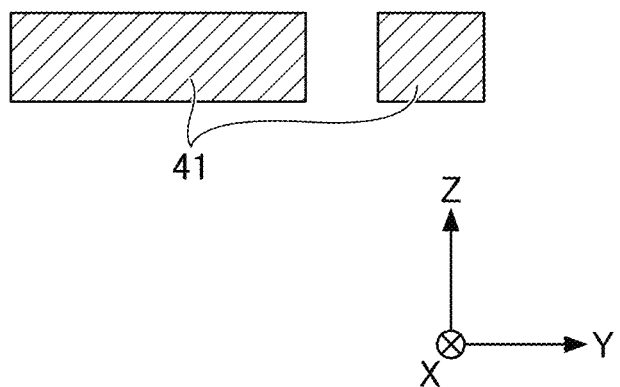
FIGS. 8A and 8B are cross-sectional views taken along line D-D in FIG. 7.
Figure 8B:
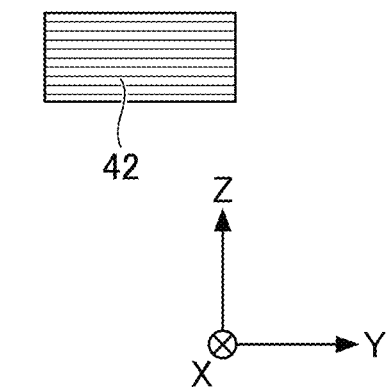

FIG. 3 is a plan view of the configuration of the first layer 10. FIG. 4 is a cross-sectional view taken along line B-B in FIG. 3. FIG. 5 is a plan view of the configuration of the second layer 20. FIG. 6 is a cross-sectional view taken along line C-C in FIG. 5. FIG. 7 is a plan view of the configuration of the third layer 30. FIGS. 8A and 8B are cross-sectional views taken along line D-D in FIG. 7.

As illustrated in FIGS. 1 to 8, the movable device 100 includes a mechanism 1 and a driver 2. The mechanism 1 and the driver 2 are arranged side by side in the Y-direction.

The mechanism 1 includes a gear 11 including teeth (first protrusions) and a cam 12 that is rotatable with rotation of the gear 11. The gear 11 and the cam 12, which are coupled to each other using a shaft center member 13, are rotatable about a rotation axis L passing through the center of the shaft center member 13 and parallel to the Z-axis. The driver 2 includes a lug 21 (a second protrusion) that engages with the teeth of the gear 11, a piezoelectric actuator 22, and a connecting portion 23 that connects between the lug 21 and the piezoelectric actuator 22.

The piezoelectric actuator 22 is an example of an actuator that reciprocates the lug 21 in accordance with an applied voltage or current. The piezoelectric actuator 22 includes an elastic portion 221 and a piezoelectric portion 222.

As illustrated in FIGS. 5 and 6, the elastic portion 221 includes a frame 221a surrounding the piezoelectric portion 222 and a beam 221b serving as a bridge between the frames 221a. The elastic portion 221 includes a silicon active layer to have elasticity. A +X-side edge 221c of the frame 221a is connected to a stationary portion 24, and a −X-side edge 221d of the frame 221a is connected to the connecting portion 23. The connecting portion 23 includes a silicon active layer to have elasticity.

The piezoelectric portion 222 is configured by stacking a lower electrode, a piezoelectric element, and an upper electrode in this order on a +Z-side surface of the beam 221b. The upper electrode and the lower electrode include, for example, gold (Au) or platinum (Pt). The piezoelectric element includes, for example, lead zirconate titanate (PZT) which is a piezoelectric material.

The driver 2 expands and contracts the piezoelectric portion 222 in the Y-direction according to the applied voltage to allow the −X-side edge 221d of the elastic portion 221 to reciprocate in the X-direction and also allow the lug 21 connected to the −X-side edge 221d via the connecting portion 23 to reciprocate in the X-direction.

The teeth of the gear 11 gets engaged with the lug 21 to allow the drive force of the reciprocation of the lug 21 to be transferred to the gear 11. Thus, the gear 11 rotates in the rotation direction 21a around the rotation axis L parallel with the Z-direction. In other words, the driver 2 causes the lug 21 to reciprocate in the X-direction to rotate the gear 11 in the rotation direction 21a (i.e., a predetermined direction.

With the rotation of the cam 12 caused by the rotation of the gear 11, the mechanism 1 causes a supporting column 31 integrated with the movable portion 3 and in contact with the outer peripheral surface 121 of the cam 12 to reciprocate in the Y-direction. The pressing plates 14a to 14c are members that substantially prevent displacements of the gears 11 in the Z-direction due to the rotation.

The movable portion 3 is a plate on the +Z-side surface of the mechanism 1 and includes a reflecting surface 34 on its +Z-side surface. The movable portion 3 is connected to one end of each of torsion bars 32a and 32b which are torsion beams provided so as to sandwich the movable portion 3 along the X-direction. The torsion bars 32a and 32b each include a silicon active layer to have elasticity.

The other end of each of the torsion bars 32a and 32b is connected to the support frame 33. Each of the torsion bars 32a and 32b is an example of a support that supports the movable portion 3 while allowing the movable portion 3 to oscillate about the oscillation axis M passing through the central axis of each of the torsion bars 32a and 32b and parallel to the X-direction.

The movable portion 3 continuously changes the tilt around the oscillation axis M with the reciprocation of the supporting column 31 in the Y-direction.

As illustrated in FIG. 7, the third layer 30 includes a device support 41 supporting the mechanism 1 and a driver support 42 supporting the driver 2.

The manner in which the movable portion 3 is driven will be described with reference to FIGS. 9 to 13.

Figure 9:
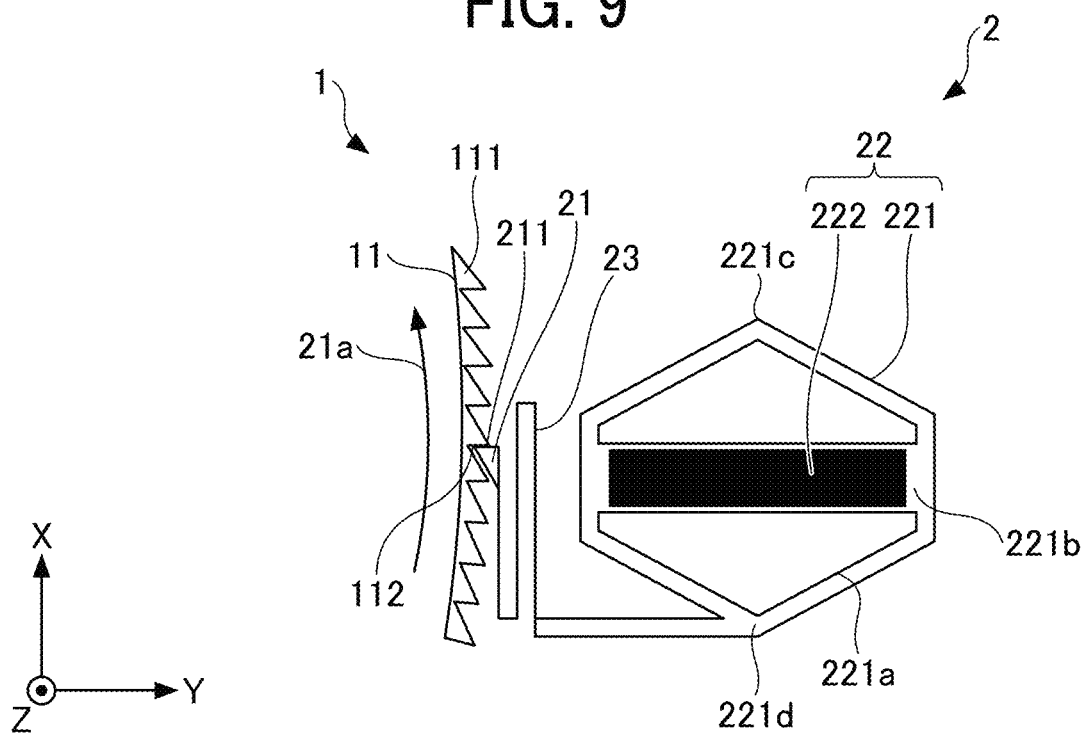
FIG. 9 is a plan view of the engagement of a gear and a lug, according to an embodiment.

FIG. 9 is a plan view of the engagement of the gear 11 and the lug 21, according to an embodiment. As illustrated in FIG. 9, teeth 111 are formed on the outer peripheral surface of the gear 11. Each of the teeth 111 has a shape in which a downstream portion of each teeth III in the rotation direction 21a is lower in a direction (i.e., the Y-direction) perpendicular to the rotation direction 21a, than an upstream portion of a corresponding tooth of the teeth 111.

The shape of each of the teeth 111 in which a downstream portion of each of the teeth 111 in the rotation direction 21a is lower in a direction (i.e., the Y-direction) perpendicular to the rotation direction 21a than an upstream portion of a corresponding tooth of the teeth 111 refers to a shape in which a downstream portion of each of the teeth 111 in the rotation direction 21a is farther from the driver 2 than an upstream portion of a corresponding tooth is, in a direction (for example, the Y-direction) in which the teeth 111 and the lug 21 face each other. Such a shape of the teeth 111 has, for example, an inclined surface whose height (in the Y-direction) decreases from upstream to downstream in the rotation direction 21a.

The lug 21 of the driver 2 is provided so as to be able to engage (mesh) with the teeth 111. The lug 21 has a shape in which a downstream portion of the lug 21 in the rotation direction 21a is higher in the direction perpendicular to the rotation direction 21a than an upstream portion of the lug 21.

The shape of the lug 21 in which a downstream portion of the lug 21 in the rotation direction 21a is higher in the direction perpendicular to the rotation direction 21a than an upstream portion of the lug 21 refers to a shape in which the downstream portion of the lug 21 in the rotation direction 21a is closer to the mechanism 1 than the upstream portion of the lug 21, in the direction in which the lug 21 and the teeth 111 face each other (e.g., the Y-direction). Such a shape of the lug 21 is, for example, an inclined surface whose height (in the Y-direction) increases from upstream to downstream in the rotation direction 21a.

When the piezoelectric portion 222 of the piezoelectric actuators 22 contracts along the Y-axis according to the applied voltages, the frame 221a contracts along the Y-axis, and the lug 21 is displaced in the −X-direction. During the displacement of the lug 21 in the −X-direction, the lug 21 presses the connecting portion 23 in the +Y-direction along the inclination of the lug 21. When the lug 21 passes the top (the highest point in the Y-direction) of each tooth of the teeth 111, the lug 21 is pressed by the connecting portion 23 in the −Y-direction back to the lowest position (in the Y-direction) of the next tooth of the teeth 111.

When the voltage applied to the piezoelectric portion 222 reaches 0 V with the lug 21 pushed back to the lowest point of the next tooth of the teeth 111, the piezoelectric portion 222 expands back to the original state from the contracted state, whereas frame 221a expands back to the original state because of the elastic restoring force. In response to the expansion of the frame 221a, the lug 21 is displaced in the +X-direction. With the displacement of the lug 21 in the +X-direction, a lug-side vertical plane 211 pushes a tooth-side vertical plane 112 in the +X-direction. Thus, the gear 11 rotates in the rotation direction 21a. Herein, the lug-side vertical plane 211 refers to a surface of the lug 21 substantially perpendicular to the X-direction, and the tooth-side vertical plane 112 refers to a surface of each of the teeth 111 substantially perpendicular to the X-direction.

The gear 11 rotates by an angle corresponding to the interval (pitch) of one tooth of the teeth 111 during one set of expansion and contraction of the piezoelectric portion 222 in the Y-direction. The driver 2 rotates the gear 11 with repeated sets of expansion and contraction of the piezoelectric portion 222 in the Y-direction.

Figure 10:
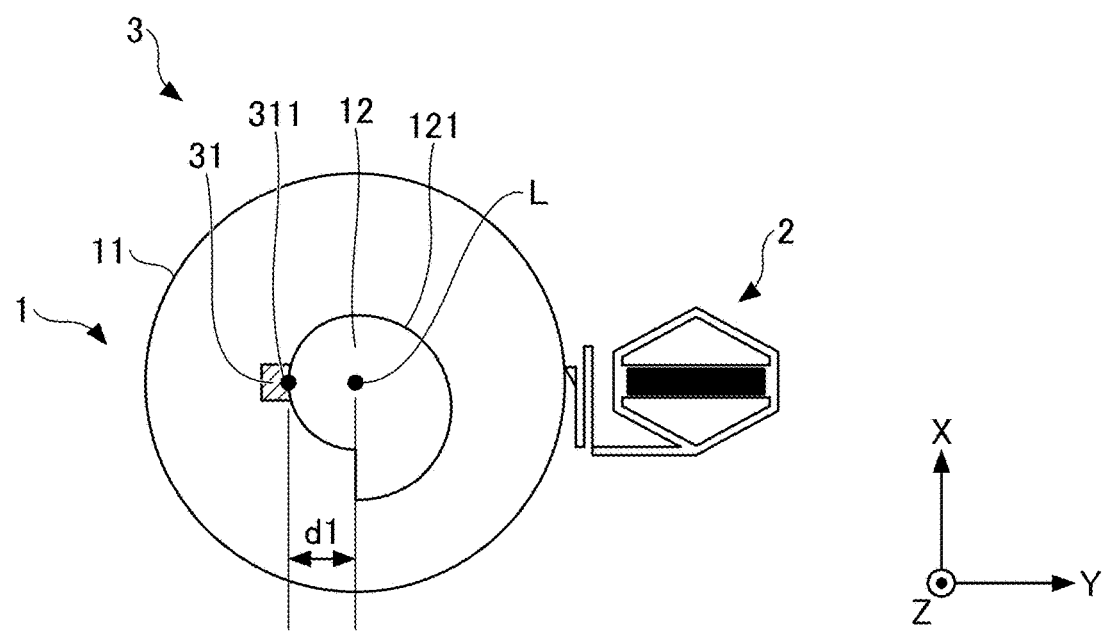
FIG. 10 is a plan view of a first example of a driving operation of the movable portion.
Figure 11:
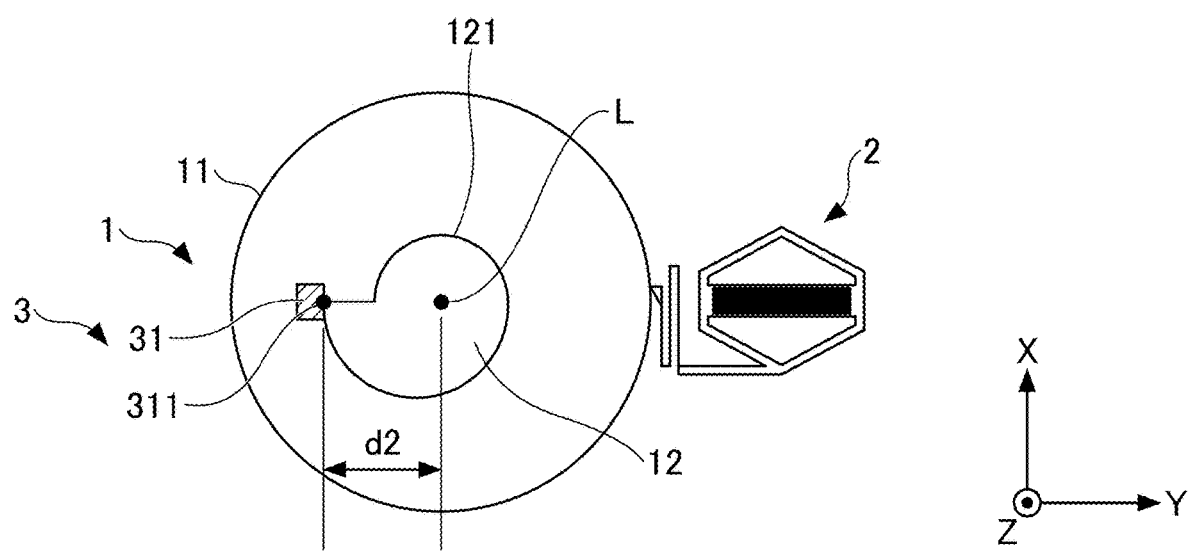
FIG. 11 is a plan view of a second example of a driving operation of the movable portion.

FIG. 10 is a plan view of a first example of a driving operation of the movable portion 3. FIG. 11 is a plan view of a second example of a driving operation of the movable portion 3.

As illustrated in FIGS. 10 and 11, a cam 12 is a plate that partially includes a linear portion extending in the radial direction and has a non-axisymmetric shape with respect to the rotation axis L in a plan view. With this plan-view shape, the cam 12 is configured such that the distance between the rotation axis L and the contact portion 311 changes with the rotation of the cam 12. The contact portion 311 refers to a portion where the cam 12 contacts the supporting column 31.

In the state illustrated in FIG. 10, a distance d1 is provided between the rotational axis L and the contact portion 311. In the state illustrated in FIG. 11 in which the cam is rotated by approximately 270 degrees in the rotation direction 21a from the state in FIG. 10, a maximum distance d2 is provided between the rotation axis L and the contact portion 311.

When the state in FIG. 10 transitions to the state in FIG. 11 with the rotation of the cam 12, the supporting column 31 is pushed by the outer peripheral surface 121 of the cam 12 to move in the −Y-direction by a distance of "d2−d1". With a further rotation of the cam 12 thereafter, the distance between the rotation axis L and the contact portion 311 decreases, and the supporting column 31 moves in the +Y-direction according to the distance between the rotation axis L and the contact portion 311. With a still further rotation of the cam 12, the distance between the rotation axis L and the contact portion 311 gradually increases to move the supporting column 31 in the −Y-direction according to the distance between the rotation axis L and the contact portion 311.

As described above, in the device 1, the cam 12 rotates with the rotation of the gear 11 caused by the driver 2 to move the supporting column 31 (of the movable portion 3) in contact with the outer peripheral surface 121 of the cam 12 in the Y-direction. The supporting column 31 of the movable portion 3 reciprocates in the Y-direction with repeated rotations of the cam 12.

Figure 12:
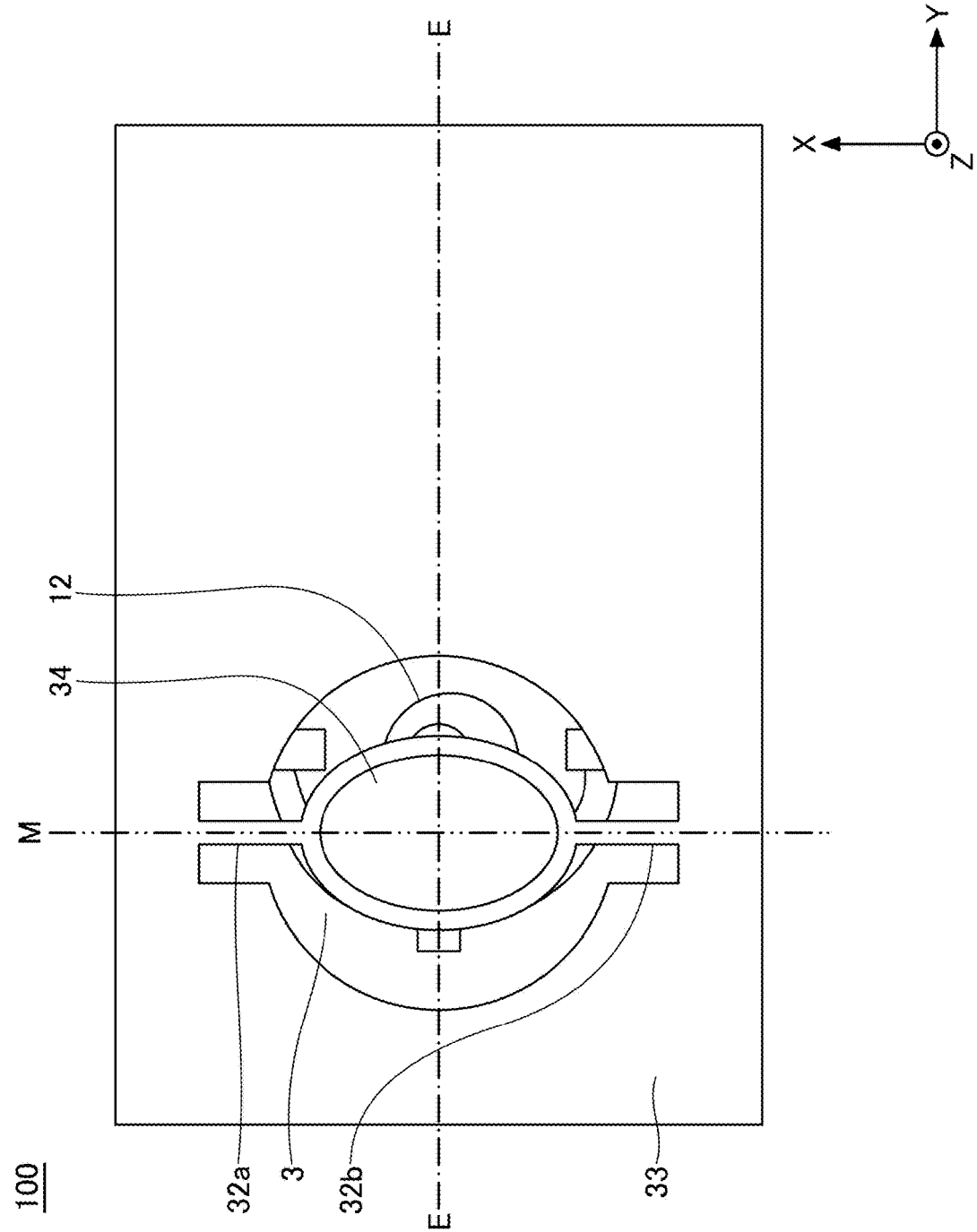
FIG. 12 is a plan view of an oscillation example of the movable portion.
Figure 13:
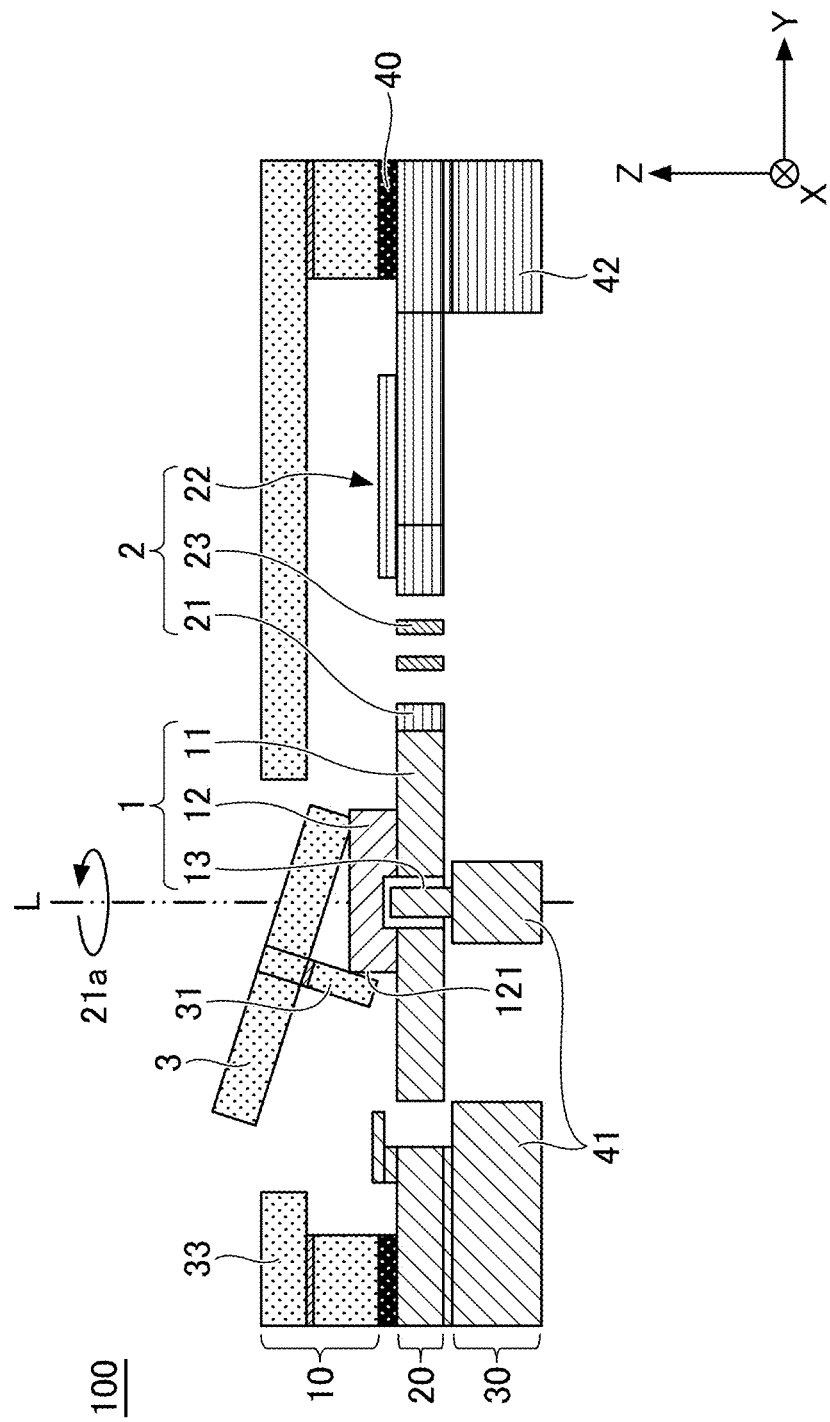
FIG. 13 is a cross-sectional view taken along line E-E in FIG. 12.

FIG. 12 is a plan view of an example of an oscillation of the movable portion 3 caused by reciprocation of the supporting column 31 of the movable portion 3 in the Y-direction. FIG. 13 is a cross-sectional view taken along line E-E in FIG. 12.

Since the movable portion 3 is supported by the torsion bars 32a and 32b, the position of the movable portion 3 remains unchanged irrespective of movement of the supporting column 31 in the Y-direction. Instead, the torsion bars 32a and 32b are twisted to tilt the movable portion 3 around the oscillation axis M. The reciprocation of the supporting column 31 of the movable portion 3 in the Y-direction continuously changes the tilt of the movable portion 3 to oscillate the movable portion 3 around the oscillation axis M.

The oscillation of the movable portion 3 changes the reflection direction of, for example, a laser beam incident on the reflecting surface 34 to change the irradiation position of the reflected laser beam.

Figure 14:
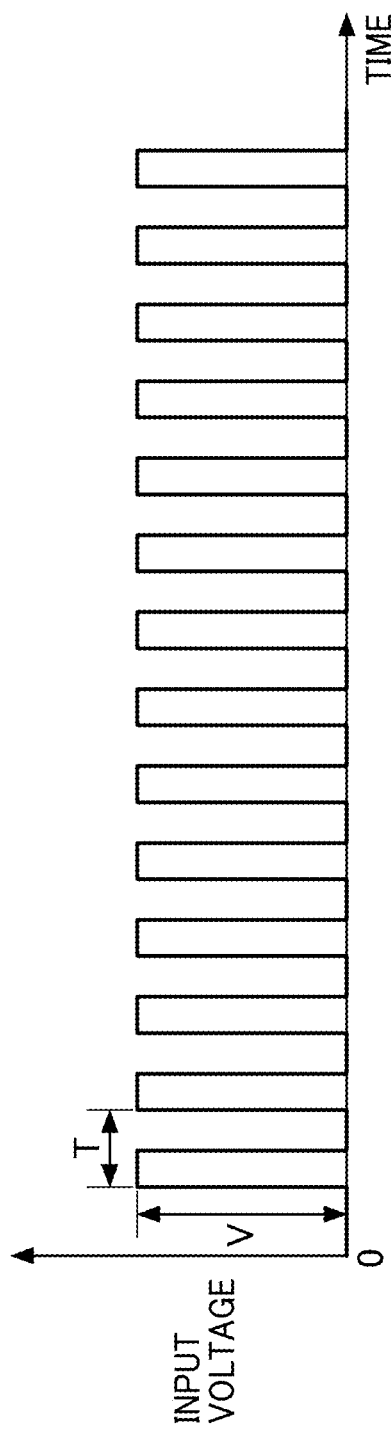
FIG. 14 is a graph of drive voltage of a piezoelectric actuator, according to an embodiment.
Figure 15:
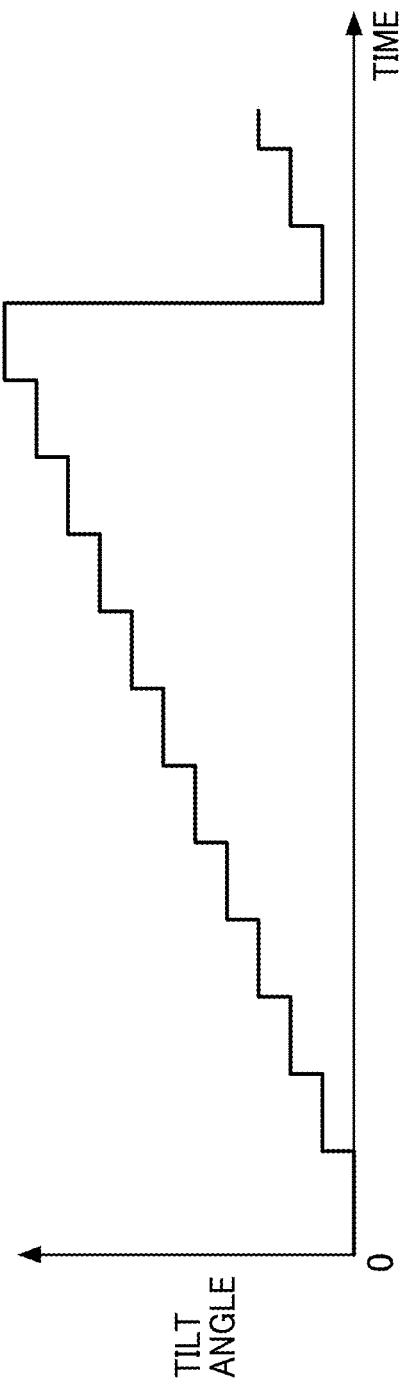
FIG. 15 is a graph of changes in the tilt angle of a reflecting surface with the drive voltage in FIG. 14.

FIG. 14 is a graph of drive voltage of a piezoelectric actuator 22, according to an embodiment. FIG. 15 is a graph of changes in the tilt angle of the reflecting surface 34 with the drive voltage in FIG. 14.

As illustrated in FIG. 14, a pulse voltage having a voltage value V in a period T is applied to the piezoelectric actuator 22. The piezoelectric portion 222 contracts along the Y-axis in response to the application of the voltage having the voltage value V. The frame 221a contracts along the Y-axis together with the piezoelectric portion 222 (see FIG. 9). When the applied voltage reaches 0 V, the piezoelectric portion 222 expands back to the original state, and the frame 221a expands back to the original state from the contracted state because of the elastic restoring force.

During the expansion of the frame 221a, the lug-side vertical plane 211 pushes the tooth-side vertical plane 112 in the +X-direction to rotate the gear 11 in the rotation direction 21a. With the rotation of the gear 11, the outer peripheral surface 121 of the cam 12 pushes the supporting column 31 to change the tilt angle of the reflecting surface 34 of the movable portion 3.

The reflecting surface 34 immediately changes its tilt angle in response to expansion of the frame 221a, and stops changing the tilt angle when the frame 221a gets back to the original state. This is illustrated in FIG. 15 such that the tilt angle of the reflecting surface 34 increases in steps in response to repeated applications of pulse voltage over periods T to the piezoelectric actuator 22. When the distance between the rotation axis L and the contact portion 311 reaches the maximum distance d2, the tilt angle of the reflecting surface 34 reaches a maximum. Thereafter, the tilt angle of the reflecting surface 34 decreases to reach a minimum as the distance between the rotation axis L and the contact portion 311. After that, the tilt angle of the reflecting surface 34 gradually increases with the rotation of the cam 12.

The piezoelectric actuator 22 is driven in response to application of voltage V. When the voltage is 0 V (i.e., no voltage is applied to the piezoelectric actuator 22), the piezoelectric actuator 22 stops. When the piezoelectric actuator 22 is at a stop, the mechanism 1 is motionless because the teeth 111 of the gear 11 mesh with the lug 21. With the state of the device 1, the movable portion 3 maintains a stationary state even if no voltage is applied. In other words, the movable device 100 drives the movable portion 3 by applying a voltage and stops the movable portion 3 by not applying a voltage.

Effects of Movable Device 100

The following describes advantageous effects of the movable device 100.

The technologies for implementing an optical scanner in a MEMS device, mounted on a display device such as a projector or a sensing device such as a LiDAR device, have been actively developed and has already been put into practical use in some applications.

For the MEMS devices, demand for capabilities other than the laser scanning with oscillation of the movable portion is currently increasing. For example, a display device is expected to serve to change the drawing position according to the line of sight of a user. In the application of the sensing device, the sensing device is expected to serve to change the sensing position according to the area to be sensed in more detail.

In order to meet such demand, MEMS devices are expected to be maintained stationary at a desired angle. For example, the technology for a MEMS device used as an optical switch in a communication application is known that switches ON and OFF of the optical signal input according to the angle of the MEMS device and maintains the ON or OFF state of the optical signal input by maintaining the MEMS device stationary.

However, such known configuration involves continuous application of voltage to the actuator to maintain the movable portion such as a mirror stationary at a desired angle. This may cause an increase in power consumption and also fail to maintain the movable portion stationary at a desired angle because of temporal change in properties such as the angle of the movable portion with applied voltage. To handle such issues, a movable device that maintains the movable portion stationary without application of voltage or electric current is demanded.

The movable device 100 according to an embodiment includes a mechanism 1 that drives a movable portion 3 and a driver 2 that drives the mechanism 1. The mechanism 1 includes a gear 11 including teeth 111 (first protrusions) and a cam 12 that is rotatable with rotation of the gear 11. With the rotation of the cam 12, the movable device 100 drives the movable portion 3 in contact with the cam 12 in the Y-direction.

The driver 2 includes a lug 21 (a second protrusion) that engages with the teeth 111, and a piezoelectric actuator 22 (an actuator) that causes the lug 21 to reciprocate in response to application of voltage. The driver rotates the gear 11 in the rotation direction 21a (a predetermined direction) by causing the lug 21 to reciprocate.

The teeth 111 have a shape in which a downstream portion of each tooth of the teeth 111 in the rotation direction 21a is lower in a direction perpendicular to the rotation direction 21a than an upstream portion of a corresponding tooth of the teeth 111. The lug 21 has a shape in which a downstream portion of the lug 21 in the rotation direction 21a is higher in the direction perpendicular to the rotation direction 21a than an upstream portion of the lug 21.

When no voltage is applied, the driver 2 stops driving the piezoelectric actuator 22. The mechanism 1 is made stationary by engaging the teeth 111 (having a shape in which the downstream portion in the rotation direction 21a is lower in the direction perpendicular to the rotation direction 21a than the upstream portion) with the lug 21 (having a shape in which the downstream portion of the lug 21 in the rotation direction 21a is higher in the direction perpendicular to the rotation direction 21a than the upstream portion). This allows the movable portion 3 to remain stationary, and also enables the movable device 100 to maintain the movable portion 3 stationary without application of voltage.

The present embodiment achieves the movable device 100 that allows the movable portion 3 to remain stationary without application of voltage or electric current. This further reduces the power consumption of the movable device 100 and also reduces or prevents the temporal change in properties such as the angle of the movable portion 3 due to application of voltage.

In the present embodiment, the distance between the rotation axis L and the contact portion 311 of the cam 12 changes with the rotation of the cam 12. This configuration allows a movement of the supporting column 31 of the movable portion 3 with the rotation of the gear 11, which is caused by the reciprocation of the piezoelectric actuator 22.

In the present embodiment, the cam 12 having a non-axisymmetric shape with respect to the rotation axis L is illustrated as an example, but no limitation is intended thereby. The cam 12 may have any shape that allows a change in the distance between the rotation axis L of the cam 12 and the contact portion 311 with the rotation of the cam 12.

Figure 16:
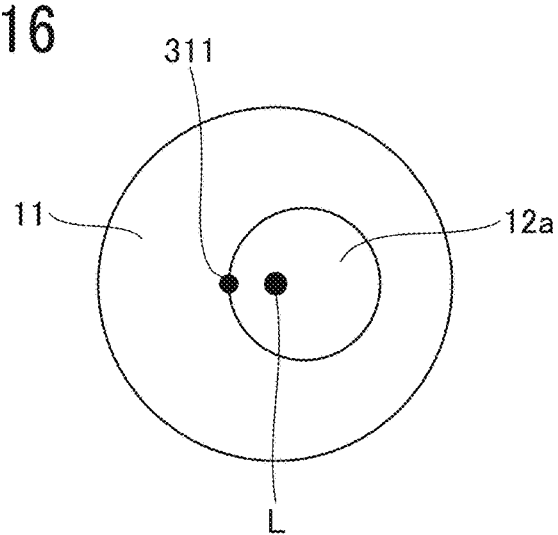
FIG. 16 is a plan view of a second example of a cam.
Figure 17:
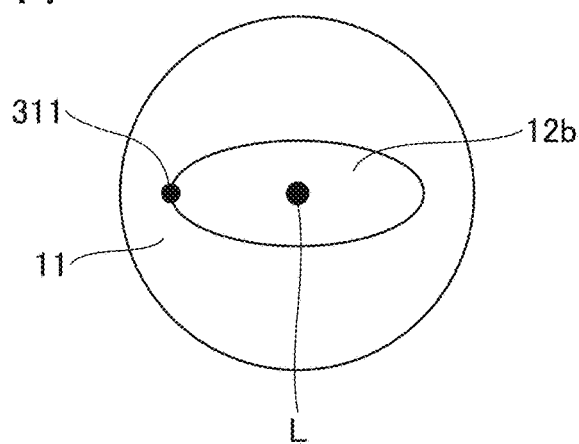
FIG. 17 is a plan view of a third example of the cam.
Figure 18:
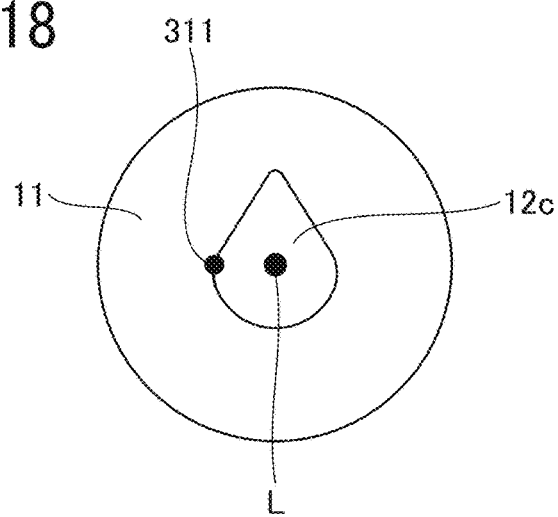
FIG. 18 is a plan view of a fourth example of the cam.

FIGS. 16 to 18 are diagrams of the configurations of cams 12a to 12c according to modifications of an embodiment. As illustrated in FIG. 16, the cam 12a is a disc-shaped member in which the rotational axis L is off-center. As illustrated in FIG. 17, the cam 12b is a plate having an elliptical outer shape. As illustrated in FIG. 18, the cam 12b is a plate having a fan-shaped outer shape. For each of the cams 12a to 12c, the distance between the rotation axis L and the contact portion 311 changes with the rotation of the cam 12 (12a to 12c) around the rotation axis L. The same advantageous effects as described above applies to each of the cams 12a to 12c.

Since the amount of movement of the movable portion 3 is changed by changing the distance between the rotation axis L of the cam 12 and the contact portion 311, the distance between the rotation axis L and the contact portion 311 is determined according to a desired amount of movement of the movable portion 3.

Further, the movable portion 3 is movable with a smaller force as the diameter of the gear 11 is larger. In view of this, the diameter of the gear 11 is determined according to a desired amount of movement of the movable portion 3.

The movable device 100 includes a movable portion 3 integral with the supporting column 31; and torsion bars 32a and 32b (supporting portions) supporting the movable portion 3 to be oscillable. The movable portion 3 oscillates with the movement of a part of the supporting column 31 caused by the mechanism 1. With this configuration, the movable portion 3 can be used as an oscillable mirror, light incident on the reflecting surface 34 on the movable portion 3 can be reflected in a desired direction, and light reflected by the reflecting surface 34 can be emitted to the surface to be scanned to achieve scanning of the surface with the light.

In the present embodiment, the movable device 100 includes the piezoelectric actuator 22 as an actuator. Since the piezoelectric actuators 22 may generate a strong force, the lug 21 can be moved with a force greater than the elastic restoring force of the frame 221a. However, the actuator is not limited to the piezoelectric actuator 22, and another type of actuator such as an electrostatic actuator or an electromagnetic actuator may be used.

In the present embodiment, the movable device 100 includes the movable portion 3. However, in some embodiments, the movable device 100 may drive a movable portion included in an external device.

In the present embodiment, the movable device 100 is a MEMS device that is manufactured by semiconductor processing. This is only one example. Alternatively, the movable device may be a device other than the MEMS device, or may be manufactured by a manufacturing method other than the semiconductor processing. However, the movable device is preferably a MEMS device to achieve a reduction in the size of the movable device.

Second Embodiment

Next, a movable device 100a according to the second embodiment will be described. The same components as those of the first embodiment are denoted by the same reference numerals, and redundant description thereof will be omitted as appropriate.

Figure 19:
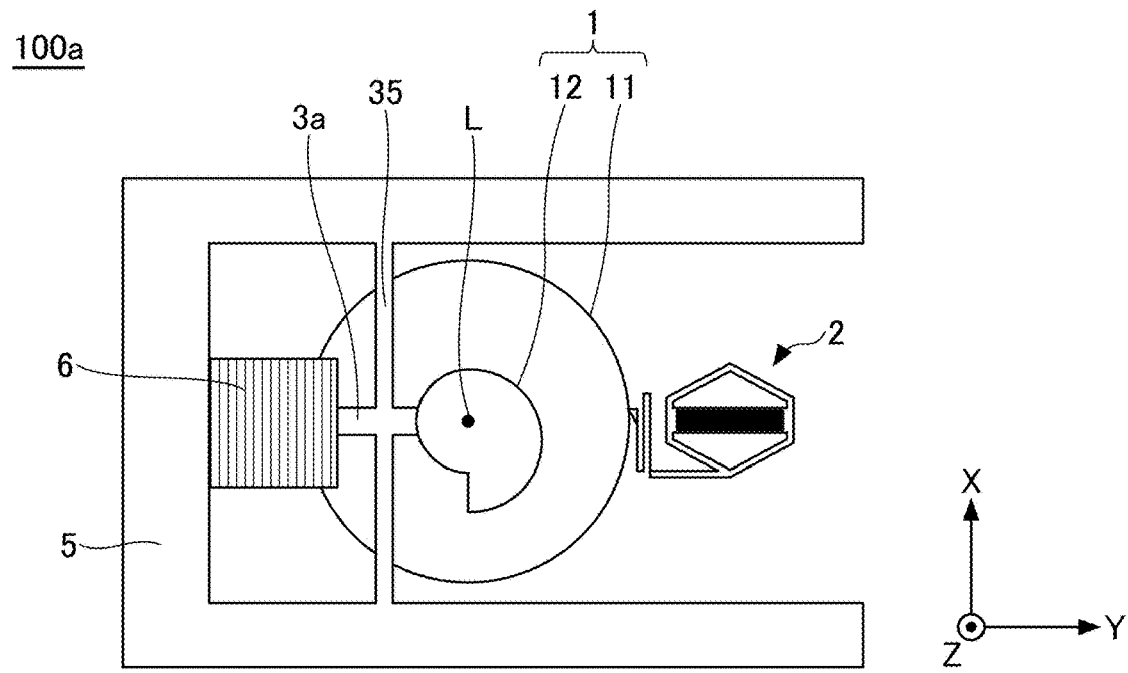
FIG. 19 is a plan view of a first example of a driving operation of a movable portion according to a second embodiment.
Figure 20:
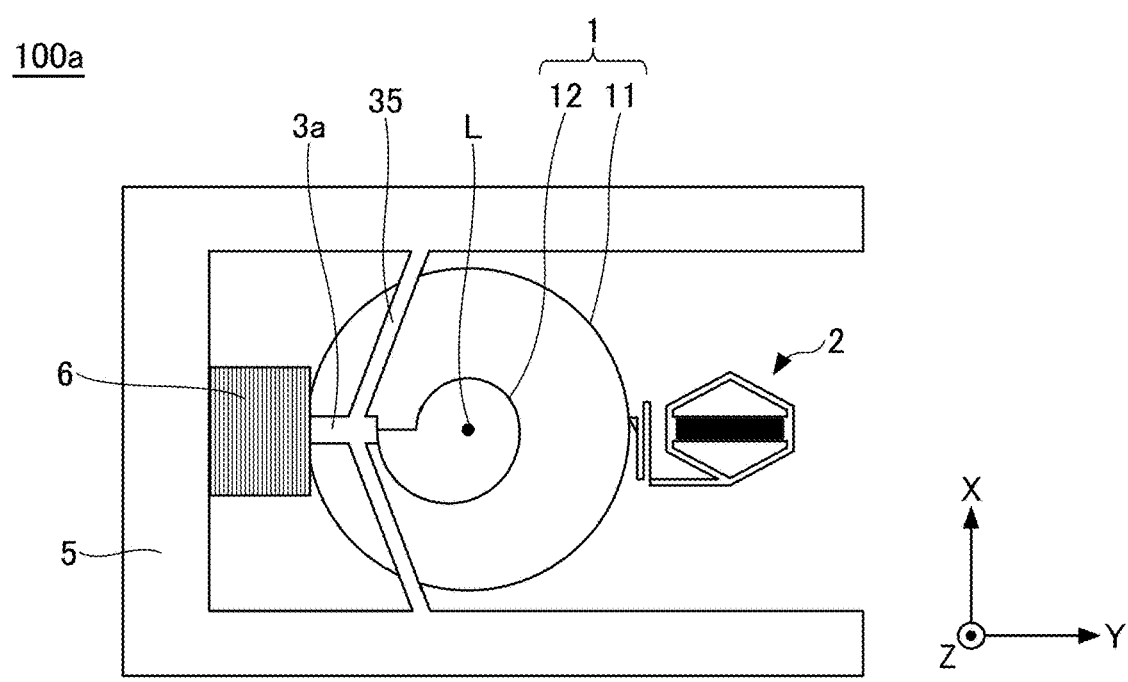
FIG. 20 is a plan view of a second example of the driving operation of the movable portion according to the second embodiment.
Figure 21:
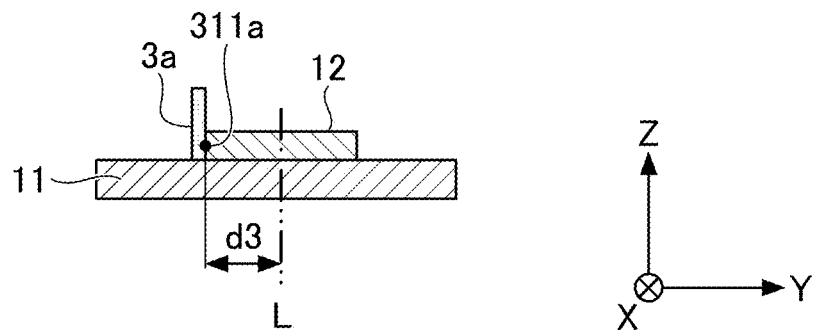
FIG. 21 is a cross-sectional view of a third example of the driving operation of the movable portion according to the second embodiment.

FIGS. 19 to 22 are illustrations of examples of the configuration of the movable device 100a. FIG. 19 is a plan view of a first example of a driving operation of the movable portion 3a included in the movable device 100a. FIG. 20 is a plan view of a second example of the driving operation of the movable portion 3a. FIG. 21 is a cross-sectional view of a third example of the driving operation of the movable portion 3a. FIG. 20 is a cross-sectional view of a fourth example of the driving operation of the movable portion 3a.

As illustrated in FIGS. 19 to 22, the movable device 100a includes a movable portion 3a and a periodic structure body 6. The movable portion 3a is connected to a support 5 via a support beam 35. The periodic structure body 6 is provided on the inner peripheral side of the support 5.

Figure 22:
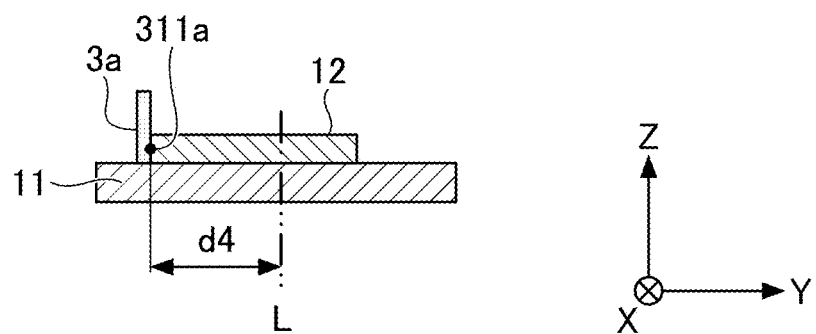
FIG. 22 is a cross-sectional view of a fourth example of the driving operation of the movable portion according to the second embodiment.

The movable portion 3a is a rectangular parallelepiped member that contacts the cam 12 included in the mechanism 1. As illustrated in FIGS. 21 and 22, with the oration of the cam 12, the movable portion 3a reciprocates in the Y-direction within a range in which the distance between the rotational axis L and the contact portion 311a changes from d3 to d4.

The rotation of the gear 11 driven by the driver 2, the rotation of the cam 12 with the rotation of the gear 11, and the reciprocation of the movable portion 3a with the rotation of the cam 12 are the same as those in the first embodiment. However, the second embodiment differs from the first embodiment in that the movable portion 3a moves in parallel in the Y-direction.

The support beam 35 is an elastic member that supports the movable portion 3a from both sides thereof in the X-direction. The support beam 35 includes, for example, a silicon active layer. The support beam 35 is deformable with the movement of the movable portion 3a.

The periodic structure body 6 includes periodic structures formed at predetermined periods, one end of which is fixed to and supported by the support 5, and the other end of which is provided to be pressed by the movable portion. The periodic structures included in the periodic structure body 6 are pressed by the movable portion 3a driven by the device 1, so as to be deformed to change the periods, or the intervals of the structures.

The periodic structure body 6 has a configuration in which movable grating structures and fixed grating structures are alternately arranged. For example, when the periodic structure body 6 is deformed in a direction in which the period of the periodic structure increases, the wavelength of light transmitted through the periodic structure body 6 or light reflected by the periodic structure body 6 can be shifted to the long wavelength side.

When the periodic structure body 6 is deformed in a direction in which the period of the periodic structure decreases, the wavelength of light transmitted through the periodic structure body 6 or light reflected by the periodic structure body 6 can be shifted to the short wavelength side.

However, the configuration of the periodic structure body 6 is not limited to a configuration in which the movable grating structure and the fixed grating structure are alternately arranged. As long as the wavelength of light incident on the periodic structure body 6 can be changed, the periodic structure body 6 may have a configuration in which a movable periodic structure and a fixed structure are alternately arranged, or a configuration in which the distance between lattice structures or periodic structures can be increased or decreased.

As one of applications of the movable device 100a, a wavelength-variable laser may be configured to include a laser light source that emits laser light of predetermined wavelengths and the movable device 100a. The wavelength-variable laser emits laser light emitted from the laser light source to the periodic structure body 6 of the movable device 100a so as to shift the wavelengths of light transmitted or reflected by the periodic structure body 6 and change the wavelengths to desired wavelengths.

As described above, in the present embodiment, when the applied voltage is 0 V and the driving of the piezoelectric actuators 22 in the driver 2 is stopped, the mechanism 1 does not move, the movable portion 3a remains stationary, and the periodic structure body 6 remains deformed. With this configuration, the movable device 100 reduces or prevents the changes in the wavelengths of light to be transmitted through or reflected by the periodic structure body 6 and stabilizes the wavelengths of the light without application of voltage or electric current. The other effects are the same as those described in the first embodiment.

Other Preferred Embodiments

The following describes configurations of the movable device 100 or 100a with reference to FIGS. 23 to 28.

Figure 23:
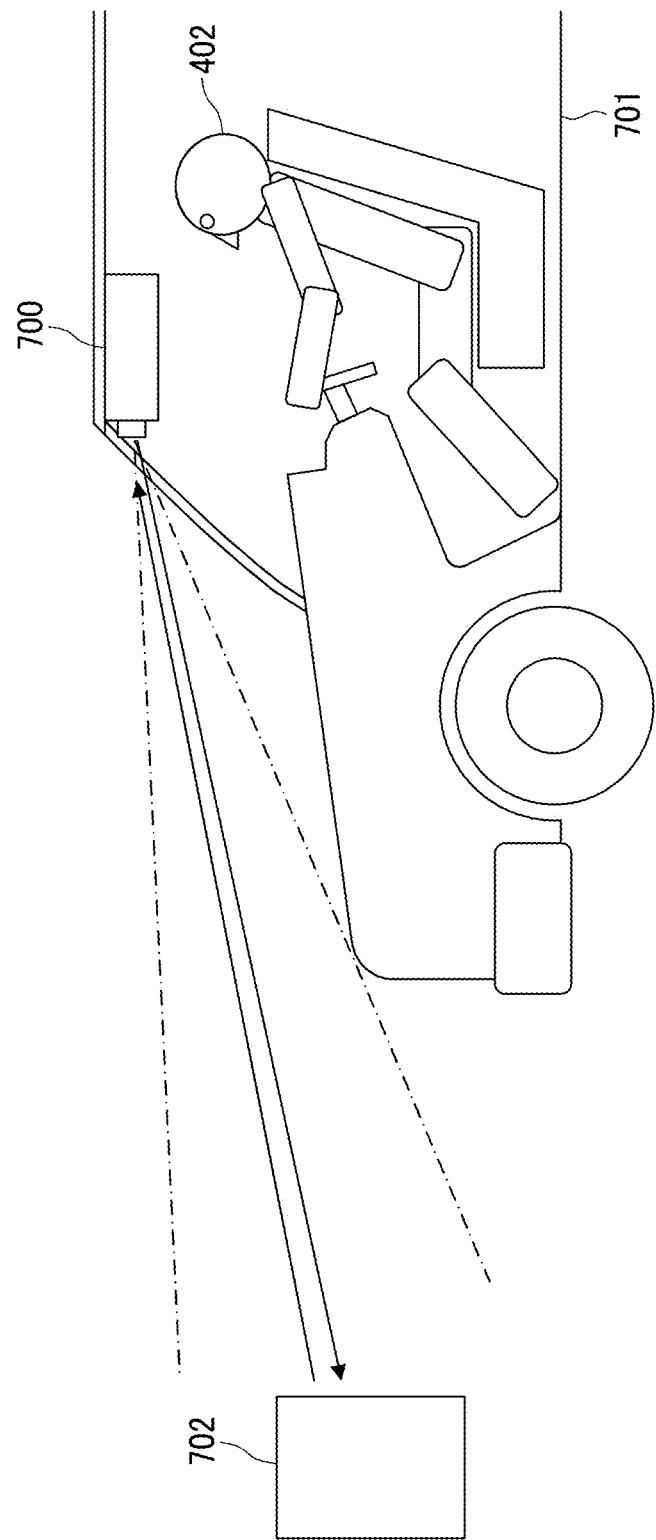
FIG. 23 is a schematic view of a vehicle equipped with a laser imaging detection and ranging (LiDAR) device, according to an embodiment of the present disclosure.
Figure 24:
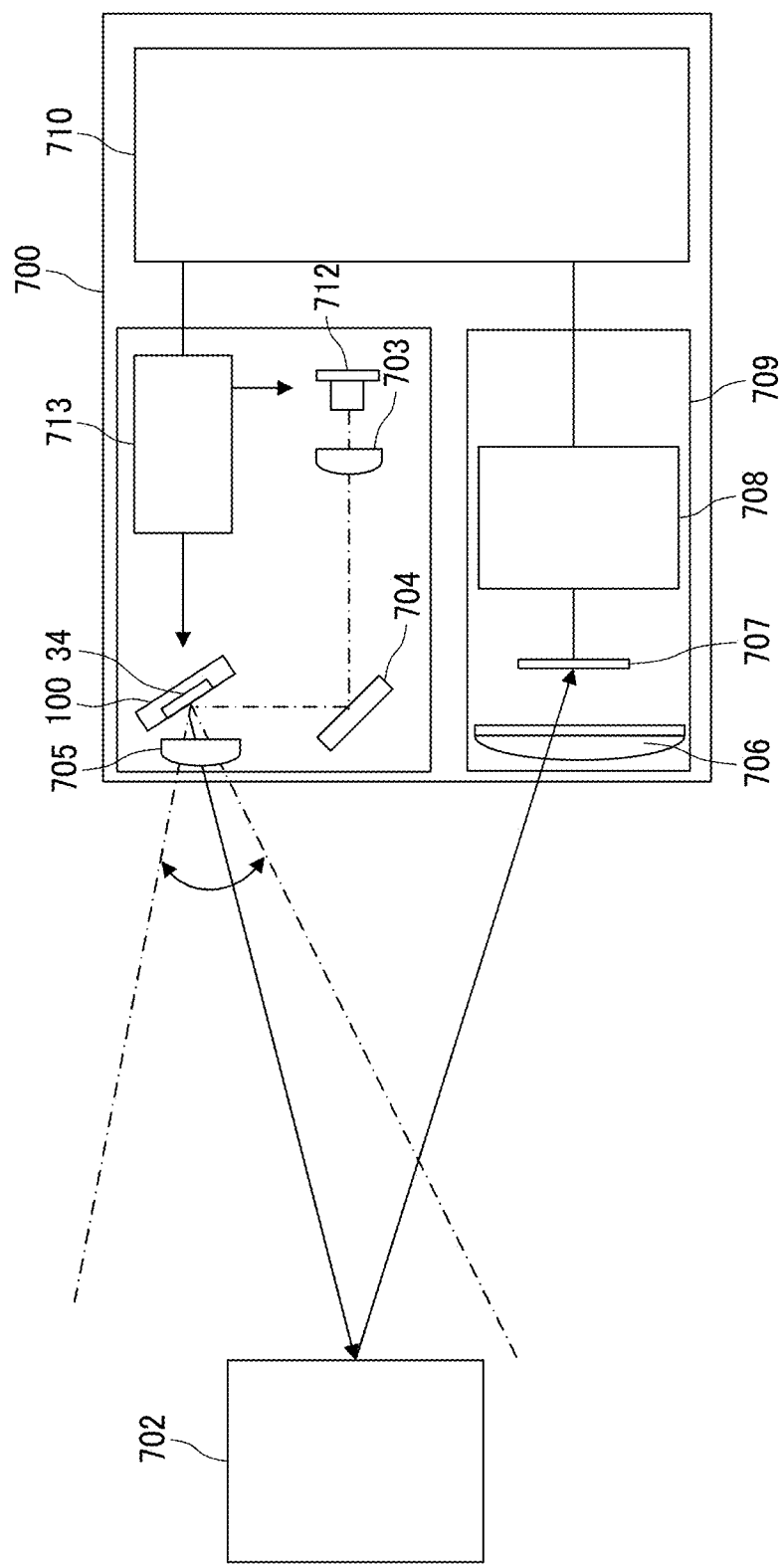
FIG. 24 is a schematic view of the LiDAR device according to an embodiment of the present disclosure.

FIG. 23 is a schematic view of a vehicle 701 equipped with a laser imaging detection and ranging (LiDAR) device 700, according to an embodiment of the present disclosure; FIG. 24 is an illustration of a LiDAR device 700 according to an embodiment mounted on the vehicle. The LiDAR device 700 is an example of a distance-measuring device including the movable device 100.

As illustrated in FIG. 23, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

As illustrated in FIG. 24, the laser beams emitted from a light-source device 712 pass through an incident optical system, and then are caused to perform scanning uniaxially or biaxially using the movable device 100 including the reflecting surface 34. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 712 and the movable device 100 is controlled by the control device.

The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 712 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 100 including the reflecting surface 34 is less likely broken and is compact compared with a polygon mirror, and thus, a highly durable and compact LiDAR device can be provided. Such a LiDAR device is mounted on, for example, a vehicle, an aircraft, a ship, a robot, or the like, and can perform optical scanning within a predetermined range to determine whether an obstacle is present or to recognize the distance to the obstacle.

Such a configuration in which the movable device 100 according to an embodiment is incorporated in a distance-measuring apparatus provides a distance-measuring apparatus that reduces the power consumption of the movable device 100 and also reduces or prevents the temporal change in properties such as the angle of the movable portion 3 due to application of voltage.

Figure 25:
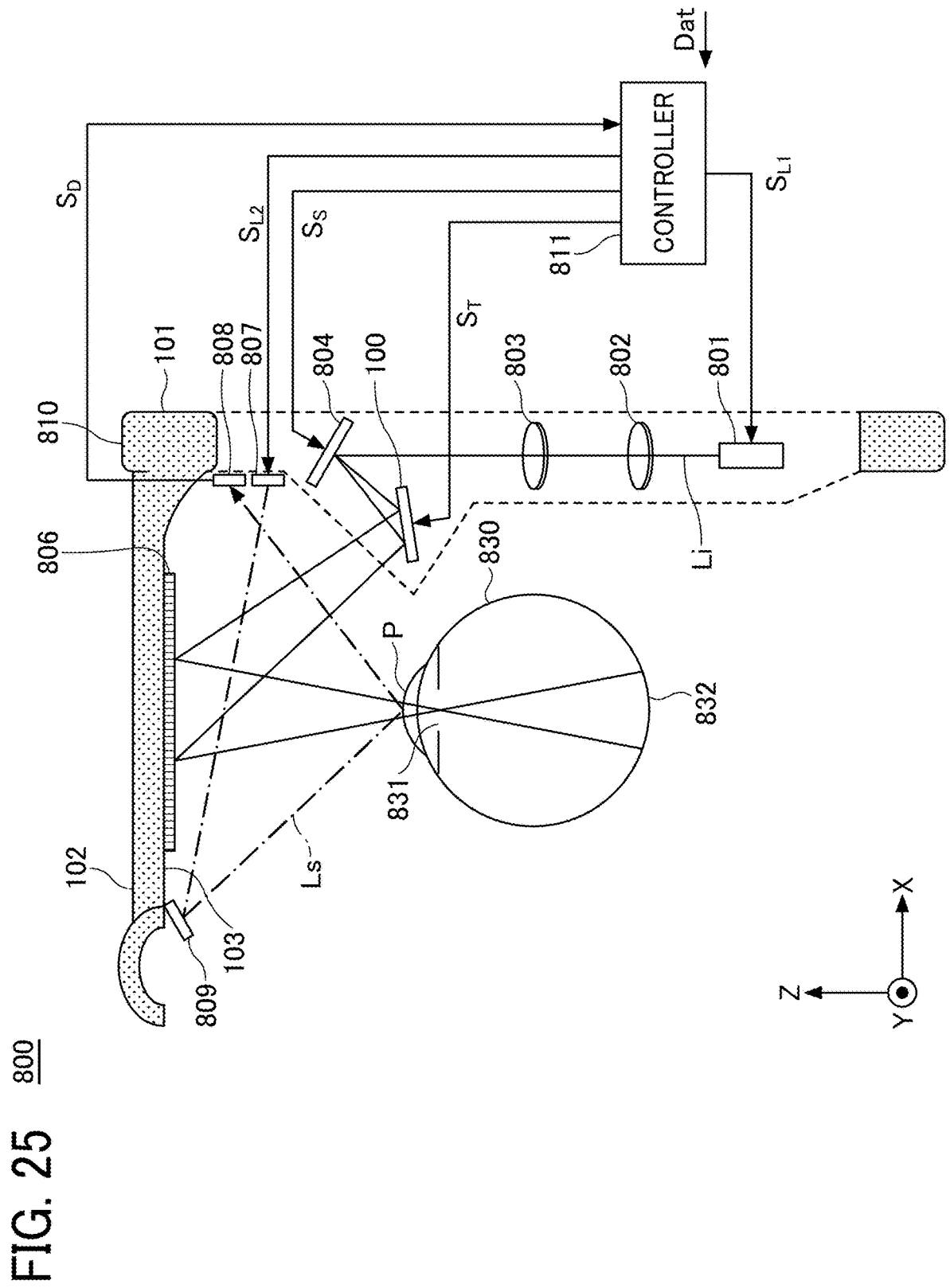
FIG. 25 is an illustration of the configuration of a retinal projection display device according to an embodiment.

FIG. 25 is an illustration of the configuration of a retinal projection display device 800 according to an embodiment. A retinal projection display device 800 according to an embodiment is a wearable terminal (i.e., wearable device) and is a head mounted display (HMD) that forms or draws an image directly on the retina of a user by laser scanning according to the Maxwellian view. The retinal projection display device 800 is an example of a display device.

As illustrated in FIG. 25, the retinal projection display device 800 includes a laser light source 801 (a laser beam emitted from which is used for forming an image), a lens 802, a lens 803, a scanning mirror 804, a movable device 100, a projection optical element 806, a laser light source 807 (a laser beam emitted from which is used for detection), a photosensor 808, and a reflector 809. The retinal projection display device 800 includes an eyeglass frame 810 and a controller 811.

The eyeglass frame 810 includes a temple 101 and a rim 102, and an eyeglass lens 103 held by the rim 102. The laser light source 801, the lens 802, the lens 803, the scanning mirror 804, the movable device 100, and the controller 811 are provided inside the temple 101. The projection optical element 806 is provided on the surface of the eyeglass lens 103 held by the rim 102. The user wears the retinal projection display device 800 on their head by putting the eyeglass frame 810 on their ears.

The laser light source 801 is a semiconductor laser that emits a laser beam Li for forming an image, having a single wavelength or multiple wavelengths. When a monochrome image is displayed, a laser light source that emits the laser beam Li having a single wavelength is used as the laser light source 801. When a color image is displayed, multiple laser light sources that emit laser beams having multiple wavelengths such as a red semiconductor laser, a green semiconductor laser, and a blue semiconductor laser, are used as the laser light source 801. The laser light source 801 emits a laser beam Li in response to a formation drive signal $S_{L1}$ from the controller 811.

The scanning mirror 804 is a mirror that oscillates about two axes substantially orthogonal to each other and perform scanning with the laser beam Li emitted from the laser light source 801. The scanning mirror 804 performs scanning with the laser light beam Li incident on the scanning mirror 804 by oscillating to change the angle of the scanning mirror 804, so as to form an image displayed in one field of view on the retina 832 of the eyeball 830.

The scanning mirror 804 deflects the laser beam Li incident thereon, in the X-direction and the Y-direction. The X-direction in FIG. 25 is a main scanning direction in which pixels are drawn continuously in terms of time to form a series of pixel groups. The Y-direction is perpendicular to the main scanning direction and refers to a sub-scanning direction in which a series of pixel groups are arranged. Scanning speed in the main scanning direction is set higher than scanning speed in the sub-scanning direction. An image is formed with the laser beam Li deflected for scanning.

The scanning mirror 804 discretely switches the deflection direction of light for forming an image in n stages (n is an integer of 1 or greater) in the Y-direction under the control of the scanning drive signal $S_S$ so as to change the position of an image formed on the retina 832. In the present embodiment, the deflection direction of the light is switched in three stages (i.e., n=3), but n is not limited to three, and n may be selected as appropriate. Herein, the image light is light to form an image. A two-axis MEMS mirror may be used as the scanning mirror 804.

The movable device 100 is disposed between the scanning mirror 804 and the projection optical element 806. The movable device 100 deflects the laser beam Li by changing its tilt. The movable device 100 deflects the scanning laser beam Li so as to irradiate the retina 832 with the laser beam Li. The movable device 100 switches the deflection direction discretely and selectively. The movable device 100 oscillates around an axis in the Y-direction and is stopped and fixed at the tilt of any one of m stages under the control of a deflection drive signal $S_T$, in which m is an integer of 1 or more.

The deflected light for forming an image is emitted toward the projection optical element 806. The movable device 100 switches the direction (the deflection direction) in which the light for forming an image has been deflected by the scanning mirror 804, at m stages in the X-direction. Herein, m is an integer of one or greater. In the present embodiment, the deflection direction of the light for forming an image is switched in three stages (i.e., m=3). However, this is only one example, and m is appropriately selected.

The projection optical element 806 is disposed between the scanning mirror 804 and the retina 832. The projection optical element 806 includes a holographic optical element that reflects and focuses the laser beam Li emitted from the movable device 100 toward the eyeball 830 of the user.

The projection optical element 806 includes x hologram regions having different focusing properties where x is an integer of two or greater, obtained by multiplying n by m (i.e., x=m×n). The x hologram regions are optically recorded. Herein, n and m are integers of one or greater. Thus, for example, when n is one (n=1), m is two (m=2), and when m is one (m=1), n is two (n=2).

Each hologram region focuses the laser beam Li on different nine viewing zones in the vicinity of the pupil 831 of the eyeball 830. The nine viewing zones are positioned such that the laser beam Li is included in the pupil 831 of the user's eye when the user views along the nine sight lines.

The configuration including the laser light source 807 and the photosensor 808 detects the direction of the line of sight of the user wearing the retinal projection display device 800. The laser light source 807 emits a laser beam $L_S$ for detection to the eyeball 830. The photosensor 808 receives the laser beam $L_S$ reflected by eyeball 830 after emitted to the eyeball 830 and outputs a detection signal $S_D$ according to the intensity of the received light to the controller 811.

The controller 811 estimates the direction of the sight line of the user based on the detection signal $S_D$ and obtains information indicating the direction of the sight line (i.e., information of the sight line). In addition, the controller 811 controls a position at which an image is projected on the retina 832 according to the information on the sight line.

The detection signal $S_D$ is projection position information or image formation object position information for providing a projection position to the controller 811. The photosensor 808 outputs the projection position information or image formation object position information to the controller 811. However, the configuration of the line-of-vision direction detector is not limited to the configuration including the laser light source 807 and the photosensor 808. Any eye tracking technology may be applied to the configuration of the line-of-vision direction detector.

The laser light source 807 is a light source array such as a vertical cavity surface emitting laser (VCSEL) or a laser diode array (LDA) that emits the laser beam $L_S$ for detection toward the cornea of the eyeball 830. The laser light source 807 includes nine light emitters corresponding to nine fields of view for the nine viewing zones. The laser beam $L_S$ emitted from the laser light source 807 preferably has the wavelengths of near-infrared light, which is non-visible light, so as to prevent the visual recognition of the user whose line-of-vision direction is detected, from being hampered. However, the wavelength of the detection laser beam $L_S$ is not limited to the wavelengths of near-infrared light, and visible light may be used.

The photosensor 808 includes at least one photodiode that receives the laser beam $L_S$ reflected by the eyeball 830 after being emitted from x light emitters of the laser light source 807 (x is an integer of 1 or greater) to the eyeball 830 via the reflector 809.

The controller 811 inputs image data Dat which is a source of an image to be formed, and controls emission of the laser beam Li from the laser light source 801 based on the image data Dat. In addition, nine light emitters (i.e., x=9) of the laser light source 807 are sequentially turned on in response to the drive signals $S_{L2}$ to control the emission of the laser beam $L_S$. In addition, based on the light emission timing of each light emitter of the laser light source 807 and the detection signal $S_D$ from the photosensor 808, the line-of-vision direction is estimated, which refers to which field of vision the line-of-vision is directed to among predetermined nine fields of view (i.e., x=9). The controller 811 controls the scanning of the scanning mirror 804 with the laser beam Li, by outputting the scanning drive signal $S_S$ to the scanning mirror 804. Further, the controller 811 controls the tilt of the movable device 100 by outputting the deflection drive signal $S_T$ to the movable device 100.

Figure 26:
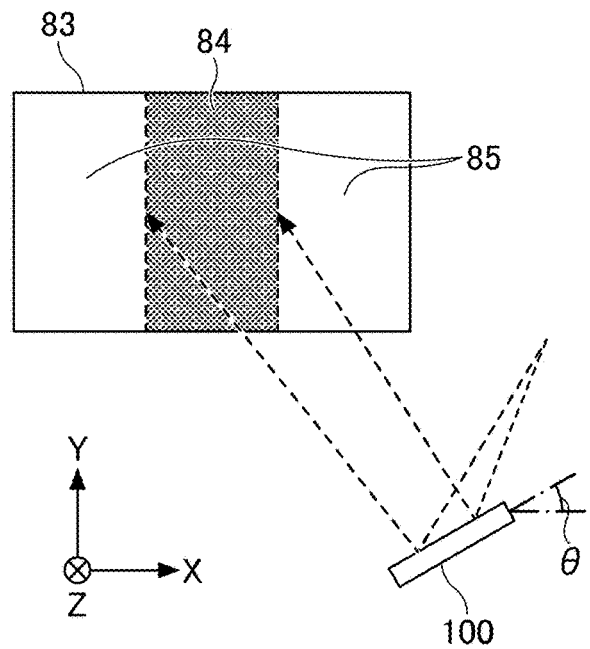
FIG. 26 is a diagram of a first example of a movable device maintained stationary in the retinal projection display device in FIG. 25.
Figure 27:
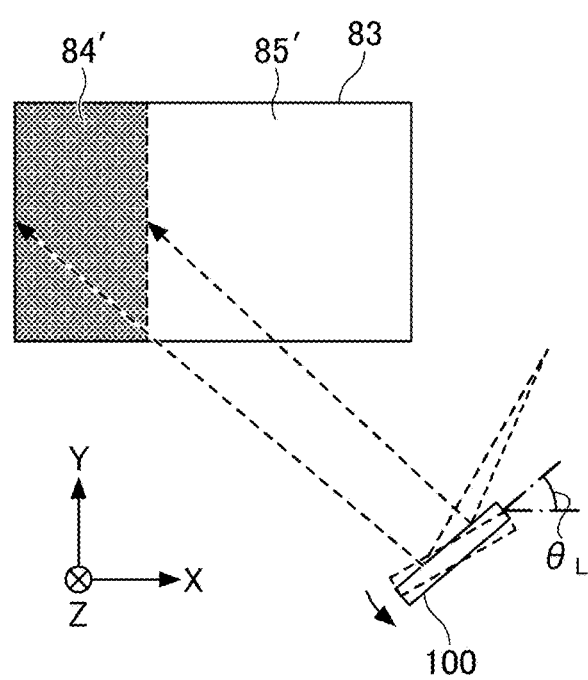
FIG. 27 is a diagram of a second example of the movable device maintained stationary in the retinal projection display device in FIG. 25.
Figure 28:
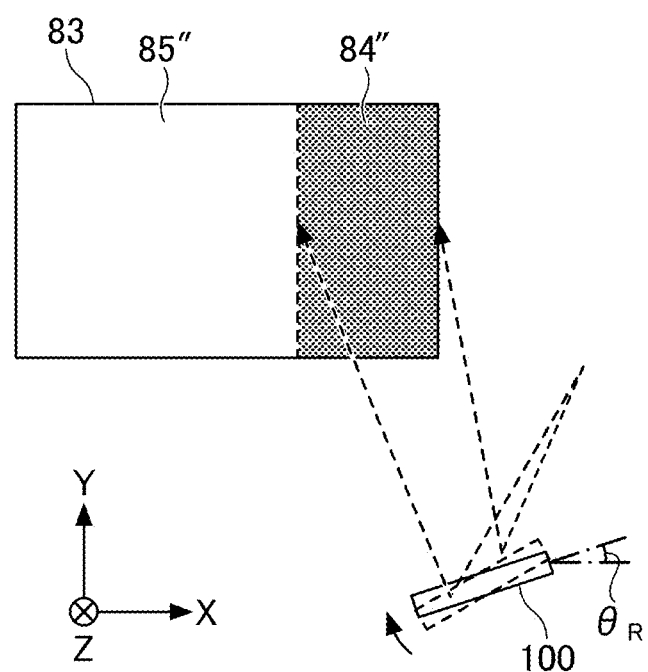
FIG. 28 is a diagram of a third example of the movable device maintained stationary in the retinal projection display device in FIG. 25.

FIGS. 26 to 28 are illustrations of a movable device 100 that remains stationary in the retinal projection display device 800.

FIG. 26 is an illustration of a first example of the movable device 100 with the movable portion 3 maintained stationary at an angle θ to allow an image to be projected onto a projection region 84 at the central portion of the surface 83 to be scanned, in the X-direction.

FIG. 27 is an illustration of a second example of the movable device 100 with the movable portion 3 maintained stationary at an angle θL to allow an image to be projected onto a projection region 84' at the −X-side portion of the surface 83.

FIG. 28 is an illustration of a third example of the movable device 100 with the movable portion 3 maintained stationary at an angle θR to allow an image to be projected onto a projection region 84" at the +X-side portion of the surface 83.

In this manner, the movable device 100 can change the position of the projection region of the image in three stages along the X-direction by deflecting the scanned image laser beam Li. Incorporating the movable device 100 into the retinal projection display device 800 reduces the power consumption of the retinal projection display device 800 and also reduces or prevents the temporal change in properties such as the angle of the movable portion 3 due to application of voltage. Such a configuration further allows the movable portion 3 to remain stationary at a desired angle and also prevents or reduces a change in the position of the projection region of the image.

Although the preferred embodiments have been described in detail above, the present disclosure is not limited to the above-described embodiments, and various modifications and substitutions may be made to the above-described embodiments without departing from the scope described in the claims.

Although in the above-described embodiments, the movable unit includes a mirror unit, the mirror unit may be replaced by, for example, a diffraction grating, a photodiode, a heater (e.g., a heater using silicon mononitride (SiN)), or a light source (e.g., a surface-emitting laser).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A movable device comprising:
a mechanism to drive a movable portion, the mechanism including:
a gear including a first protrusion; and
a cam in contact with the movable portion; and
a driver to drive the mechanism, the driver including:
a second protrusion to engage with the first protrusion; and
an actuator to:
expand and contract in a first direction in response to application of voltage or electric current; and
cause the second protrusion to reciprocate in a second direction perpendicular to the first direction in response to expansion and contraction of the actuator, to rotate the gear in the second direction, to rotate the cam with the rotation of the gear to drive the movable portion, wherein
the first protrusion has a first end and a second end in the second direction,
the second end projects more toward the second protrusion than the first end,
the second protrusion has a third end and a fourth end in the second direction, the third end being closer to the first end than the fourth end, and the fourth end being closer to the second end than the third end, and
the third end projects more toward the first protrusion than the fourth end.

2. The movable device according to claim 1, wherein a distance between a rotation axis of the cam and a contact portion at which the cam contacts the movable portion changes with rotation of the cam.

3. The movable device according to claim 1, wherein the actuator includes a piezoelectric element.

4. The movable device according to claim 1, wherein the movable device includes a micro-electromechanical system device.

5. The movable device according to claim 1, wherein: the actuator is a piezoelectric actuator.

6. The movable device according to claim 1, wherein: the movable portion includes a reflecting surface.

7. The movable device according to claim 1, wherein; the first protrusion being a right triangle and the second protrusion being a right triangle.

8. The movable device according to claim 1, wherein: the first protrusion comprises a right angle.

9. The movable device according to claim 8, wherein: the second protrusion comprises a right angle.

10. The movable device according to claim 1, wherein: the first protrusion comprises a tooth of the gear and the second protrusion comprises a lug of the driver.

11. The movable device according to claim 10, wherein: the first end of the tooth is a downstream portion in a rotational direction of the gear, the second end of the tooth is an upstream portion in the rotational direction, and the downstream portion of the tooth being farther from the driver than the upstream portion of the tooth.

12. The movable device according to claim 11, wherein: the first protrusion has a shape in which the downstream portion is lower in the first direction perpendicular to the rotational direction than the upstream portion.

13. The movable device according to claim 10, wherein: the third end of the lug is a downstream portion in a reciprocating direction of the lug, the fourth end of the lug is an upstream portion in the reciprocating direction, and the downstream portion of the lug being closer to the gear than the upstream portion of the lug.

14. The movable device according to claim 13, wherein: the second protrusion has a shape in which the downstream portion is higher in the first direction perpendicular to the reciprocating direction than the upstream portion.

15. The movable device according to claim 1, further comprising the movable portion.

16. The movable device according to claim 15, further comprising:
a support supporting the movable portion to allow the movable portion to oscillate,
wherein the movable portion is integrated with a supporting column, and the mechanism moves a part of the supporting column to oscillate the movable portion.

17. A distance-measuring device comprising the movable device according to claim 16.

18. A display device comprising the movable device according to claim 16.

19. The movable device according to claim 15, further comprising:
a periodic structure body including periodic structures formed at predetermined periods, with one end of the periodic structure body stationarily supported and the other end provided to be pressed by the movable portion.

20. A wavelength-variable laser comprising the movable device according to claim 19.

* * * * *